(12) United States Patent
Takaishi

(10) Patent No.: US 7,466,101 B2
(45) Date of Patent: Dec. 16, 2008

(54) HEAD POSITION CONTROL METHOD, HEAD POSITION CONTROL DEVICE, AND DISK DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 103 days.

(21) Appl. No.: 11/513,989

(22) Filed: Aug. 31, 2006

(65) Prior Publication Data
US 2007/0252550 A1 Nov. 1, 2007

(30) Foreign Application Priority Data
Apr. 28, 2006 (JP) ............................. 2006-125113

(51) Int. Cl.
*G05B 1/00* (2006.01)
(52) U.S. Cl. .................... 318/638; 318/560; 360/77.02; 360/77.07; 700/11; 700/12; 700/13
(58) Field of Classification Search ................ 318/638, 318/560; 360/77.02, 77.07; 700/11, 12, 700/13
See application file for complete search history.

(56) References Cited

U.S. PATENT DOCUMENTS

| | | | | |
|---|---|---|---|---|
| 5,155,422 A * | 10/1992 | Sidman et al. | ............... | 318/560 |
| 5,296,790 A * | 3/1994 | Fincher | ....................... | 318/560 |
| 5,404,253 A | 4/1995 | Painter | | |
| 5,459,381 A * | 10/1995 | Itoh | ........................... | 318/560 |
| 5,952,804 A * | 9/1999 | Hamamura et al. | ......... | 318/560 |
| 6,314,473 B1 * | 11/2001 | Singer et al. | .................... | 710/5 |
| 6,339,512 B1 | 1/2002 | Sri-Jayantha et al. | | |
| 6,487,028 B1 | 11/2002 | Sri-Jayantha et al. | | |
| 6,560,658 B2 * | 5/2003 | Singer et al. | .................... | 710/5 |
| 6,876,168 B1 * | 4/2005 | Luo et al. | .................... | 318/560 |
| 6,936,990 B2 * | 8/2005 | Oyama et al. | ................ | 318/632 |
| 6,940,685 B2 * | 9/2005 | Chrappan Soldavini et al. | .. | 360/78.06 |

(Continued)

FOREIGN PATENT DOCUMENTS

EP  1 643 491 A1  4/2006

(Continued)

OTHER PUBLICATIONS

Bickel et al.; "Disturbance Observer Based Hybrid Impedance Control"; Proceedings of the American Control Conference; 1994; pp. 729-733.

(Continued)

*Primary Examiner*—Rita Leykin
(74) *Attorney, Agent, or Firm*—Greer, Burns & Crain, Ltd.

(57) ABSTRACT

A positioning control device based on an observer control has a disturbance suppression function to which a disturbance suppression function is added without affecting the control characteristics of the observer. Models of an actuator and a disturbance model are separated, and for the disturbance model, state information is generated using an estimated gain determined from a disturbance model defined by a transfer function of which denominator is a numerator of a filter in which degrees of denominator and numerator for shaping a sensitivity function are the same, and the disturbance suppression value of the actuator is computed from the state information. The vibration of the head can be prevented adapting to a wide range of disturbance frequencies without affecting the control characteristics of the observer.

19 Claims, 16 Drawing Sheets

U.S. PATENT DOCUMENTS

| | | | |
|---|---|---|---|
| 7,050,257 B2 * | 5/2006 | Maiocchi et al. | 318/400.16 |
| 7,292,403 B2 * | 11/2007 | Baek et al. | 360/77.02 |
| 2001/0003497 A1 | 6/2001 | Takaishi | |
| 2002/0109932 A1 | 8/2002 | Aikawa et al. | |
| 2003/0133218 A1 | 7/2003 | Guo et al. | |
| 2006/0072392 A1 | 4/2006 | Semba et al. | |

FOREIGN PATENT DOCUMENTS

| | | |
|---|---|---|
| JP | 7-50075 | 2/1995 |
| JP | 2000-21104 | 1/2000 |

OTHER PUBLICATIONS

Bickel R., et al: "Hybrid Impedance Control in Constraint Coordinates Using a Disturbance Observer." Dec. 11, 1996, Proceedings of the 35th IEEE Conference on Decision and Control, Kobe, Japan Dec. 11-13, 1996, New York, NY, USA, IEEE, US, pp. 1974-1979, ISBN: 0-7803-3590-2.

* cited by examiner

HEAD POSITION CONTROL METHOD, HEAD POSITION CONTROL DEVICE, AND DISK DEVICE

CROSS-REFERENCE TO RELATED APPLICATIONS

This application is based upon and claims the benefit of priority from the prior Japanese Patent Application No. 2006-125113, filed on Apr. 28, 2006, the entire contents of which are incorporated herein by reference.

BACKGROUND OF THE INVENTION

1. Field of the Invention

The present invention relates to a head position control method for a disk device, head position control device and disk device, and more particularly to a head position control method, head position control device and disk device for suppressing position shift by disturbance, using observer control.

2. Description of the Related Art

In a disk device, such as a magnetic disk device and optical disk device, it is extremely important to accurately position the head on the target track to improve recording density.

In this positioning control, it is known that disturbance influences positioning accuracy. To suppress this disturbance by a control system, the control systems shown in FIG. 24 to FIG. 26 have been proposed. In the first prior art in FIG. 24, the position error "e" between the target position "r" and the current position "y" of the plant 108 is computed by the computing block 100, the result is input to the controller 102, and the controller 102 computes the control amount to decrease the position error "e". The position control system is added the reverse characteristic filter 104 of the notch filter in parallel to the feed back control system for driving the plant 108. The filter 104 generates a disturbance suppress amount from the position error "e", and suppresses a component around a specific frequency of the position error by adding to the control amount through a computing block 106 (see patent document: U.S. Pat. No. 6,487,028 B1).

In the second prior art, as shown in FIG. 25, the filter 104 is installed in series with the controller 102 of the feed back loop in FIG. 24, and a component around a specific frequency of the control amount of the controller 102 is suppressed (see non-patent document: R. J. Bickel and M. Tomizuka, "Disturbance observer based hybrid impedance control", Proceedings of the American Control Conference, 1995, pp. 729 to 733).

In the third prior art, as shown in FIG. 26, called as the disturbance observer is added to the feed back loop. That is, the difference between the value when the current position "y" is divided by the transfer function P of the plant 108 in the block 110, that is the twice differential value of the position error, and the current value instructed from the computing block 106, is determined by the computing block 112. And the computed difference is fed back to the computing block 106 via the band pass filter (also called Q filter) 114 using the feed back loop (see above non patent document).

To handle the eccentricity of the disk, which is a periodic disturbance, a method of correcting eccentricity using an eccentricity estimation observer has been proposed (e.g. patent document: Japanese Patent Application Laid-Open No. H7-50075, or Japanese Patent Application Laid-Open No. 2000-21104).

The eccentricity estimation observer computes the control value of the actuator from the error between the actual position error and the estimated position error using the state estimation gains A, B, C, F and L, and computes the state quantity (position, velocity, bias value, eccentricity amount) of the next sample.

Here the estimation gain L is comprised of the position estimation gain L1, velocity estimation gain L2, bias estimation gain L3 and eccentricity estimation gains L4 and L5. And L1, L2 and L3 indicate the characteristics of the controller itself, and L4 and L5 indicate the response characteristic to eccentricity, which is a periodic disturbance.

Positioning control to follow up to external vibration other than the eccentricity component using such an observer is demanded. In other words, as the recording density of the disk device increases, the influence of external vibration on the positioning accuracy of the head can no longer be ignored. For example, the vibration of a medium, or wind which the head receives by the rotation of a medium, influences the positioning accuracy of the head. Also as the use of disk devices expands, disk devices are now mounted on mobile equipment, such as a portable terminal, portable telephone and portable AV equipment, and adaptation to a wide range of disturbance frequencies is also demanded.

In the case of disturbance suppression of the above mentioned prior arts, if a compensator for selectively suppressing a specific frequency range, such as eccentricity correction, is added, the characteristics of the original control system are not influenced if the width of the suppression range is set to be extremely narrow. However along with adapting to a wide range of disturbance frequencies that is now demanded, the characteristics of the original control are affected if the suppression width is set to be wide, or if the disturbance of a high frequency range is suppressed, therefore adding a desired disturbance suppression function is difficult.

Also in the case of the prior arts, if a disturbance suppression function is added after one observer is designed, the characteristics of the entire control system, such as pole positioning, shift considerably, and a redesign of the entire observer is required. In other words, in the case of the prior arts where the disturbance models are determined and then the observer is designed including the controller and disturbance suppression functions, if a specific disturbance suppression function is added after, the entire observer is influenced and redesign is required.

SUMMARY OF THE INVENTION

With the foregoing in view, it is an object of the present invention to provide a head position control method, head position control device and disk device for adapting to various disturbance frequencies without affecting the control characteristics of the observer.

It is another object of the present invention to provide a head position control method, head position control device and disk device for adapting to disturbance frequencies in a wide range and preventing the vibration of the head without affecting the control characteristics of the observer.

It is still another object of the present invention to provide a head position control method, head position control device and disk device for adapting to disturbance frequencies in a wide range, and improving the follow up performance of the head, without affecting the control characteristics of the observer.

It is still another object of the present invention to provide a head position control method, head position control device and disk device for adapting to disturbance frequencies in a wide range, and improving the read/write characteristics of the head, without affecting the control characteristics of the observer.

A head positioning control method of the present invention is a head positioning control method for controlling the positioning of a head to a predetermined position of a disk storage medium by an actuator. The method has a step of computing a position error from a target position of the head and a current position acquired from the head, a step of generating state information using an estimated gain of the actuator according to an estimated position error between the position error and an estimated position of an observer, and computing a control value of the actuator from the state information, a step of computing a disturbance suppression value of the actuator from state information by generating state information using an estimated gain determined from a disturbance model defined by a transfer function of which a denominator is a numerator of a filter in which degrees of the denominator and nominator for shaping a sensitivity function are the same, according to the estimated position error, and a step of adding the control value and the disturbance suppression value and driving the actuator.

A disk device of the present invention has a head for at least reading data of a disk storage medium, an actuator for positioning the head at a predetermined position of the disk storage medium, and a control unit for computing a position error from a target position of the head and a current position acquired from the head, generating state information using an estimated gain of the actuator according to the estimated position error between the position error and an estimated position of an observer, and computing a control value of the actuator from the state information, and computing a control value of the actuator from the state information. And the control unit generates state information using an estimated gain determined from a disturbance model defined by a transfer function of which a denominator is a numerator of a filter in which degrees of the denominator and numerator for shaping a sensitivity function are the same, according to the estimated position error, computes a disturbance suppression value of the actuator from the state information, adds the control value and the disturbance suppression value, an drives the actuator.

A head position control device of the present invention is a head position control device for positioning a head for at least reading data of a disk storage medium to a predetermined position on the disk storage medium by controlling an actuator, having: an observer for computing an estimated position error from a target position of the head and a current position acquired from the head, generating state information using an estimated gain of the actuator according to an estimated position error between the position error and an estimated position of the observer, and computing a control value of the actuator from the state information; a disturbance observer for generating state information using an estimated gain determined from a disturbance model defined by a transfer function of which denominator is a numerator of a filter in which degrees of the denominator and numerator for shaping a sensitivity function are the same, according to the estimated position error, and computing a disturbance suppression value of the actuator from the state information; and an addition block for adding the control value and the disturbance suppression value, and driving the actuator.

In the present invention, it is preferable that the disturbance suppression value computing step further has a step of generating state information using an estimated gain determined from a disturbance model of which pole is the zero point of the numerator of the filter for shaping the sensitivity function according to a desired disturbance frequency, and computing a disturbance suppression value of the actuator from the state information.

Also in the present invention, it is preferable that the disturbance suppression value computing step further has a step of generating state information using an estimated gain determined from a disturbance model of which denominator is the numerator of a linear or a quadratic filter for shaping the sensitivity function according to a desired disturbance frequency, and computing a disturbance suppression value of the actuator from the state information.

Also in the present invention, it is preferable that the disturbance suppression value computing step further has a step of generating state information using an estimated gain determined from a plurality of disturbance models defined by a transfer function of which denominator is the numerator of the plurality of filters according to the plurality of disturbance frequencies to be suppressed according to the estimated position error, and computing a plurality of disturbance suppression values of the actuator from the state information, and a step of adding the plurality of disturbance suppression values.

Also in the present invention, it is preferable that the control unit generates state information using an estimated gain determined from a disturbance model of which pole is the zero point of the numerator of the filter for shaping the sensitivity function according to a desired disturbance frequency, and computes a disturbance suppression value of the actuator form the state information.

Also in the present invention, it is preferable that the control unit generates state information using an estimated gain determined from a disturbance model of which denominator is the numerator of a linear or quadratic filter for shaping the sensitivity function according to a desired disturbance frequency, and computes a disturbance suppression value of the actuator from the state information.

Also in the present invention, it is preferable that the control unit generates state information using an estimated gain determined from a plurality of disturbance models defined by a transfer function of which denominator is the numerator of the plurality of filters according to the plurality of disturbance frequencies to be suppressed according to the estimated position error, computes a plurality of disturbance suppression values of the actuator from the state information, and adds the plurality of disturbance suppression values.

Also in the present invention, it is preferable that the control unit generates state information using an estimated gain determined from a disturbance model defined by a transfer function of which denominator is the numerator of a linear filter for performing steady bias compensation and a quadratic filter for suppressing around a specific frequency to be a notch filter form, and computes a disturbance suppression value of the actuator from the state information.

Also in the present invention, it is preferable that the control unit generates state information using an estimated gain determined from a disturbance model defined by a transfer function of which denominator is the numerator of a linear filter for performing steady bias compensation and a quadratic filter for uniformly suppressing a specific frequency or less, and computes a disturbance suppression value of the actuator from the state information.

Also in the present invention, it is preferable that the control unit generates state information using an estimated gain determined from a disturbance model defined by a transfer function of which denominator is the numerator of a quadratic filter for suppressing around the specific frequency which is in a relatively high frequency range to be a notch filter form, and computes a disturbance suppression value of the actuator from the state information.

Also in the present invention, it is preferable that the control unit generates state information using an estimated gain determined from a plurality of disturbance models defined by a transfer function of which denominator is the numerator of a plurality of quadratic filters for suppressing around the plurality of specific frequencies to be a notch filter form, and computes a disturbance suppression value of the actuator from the state information.

Also in the present invention, it is preferable that the control unit generates state information using an estimated gain determined from a disturbance model defined by a transfer function of which denominator is the numerator of a quadratic filter for uniformly suppressing the specific frequency or less which is a relatively low frequency range, and computes a disturbance suppression value of the actuator from the state information.

Since the state information is generated using an estimated gain determined from a disturbance model defined by a transfer function of which denominator is a numerator of a filter in which degrees of the denominator and numerator for shaping the sensitivity function are the same, and a disturbance suppression value of the actuator is computed from this state information, vibration of the head can be prevented adapting to a wide range of disturbance frequencies, without affecting the control characteristics of the observer.

DESCRIPTION OF THE PREFERRED EMBODIMENTS

Embodiments of the present invention will now be described in the sequence of the disk device, first embodiment of observer, design method, example of first embodiment, second embodiment, examples of second embodiment and other embodiments, but the present invention is not limited to these embodiments.

Disk Device

Figure 1:
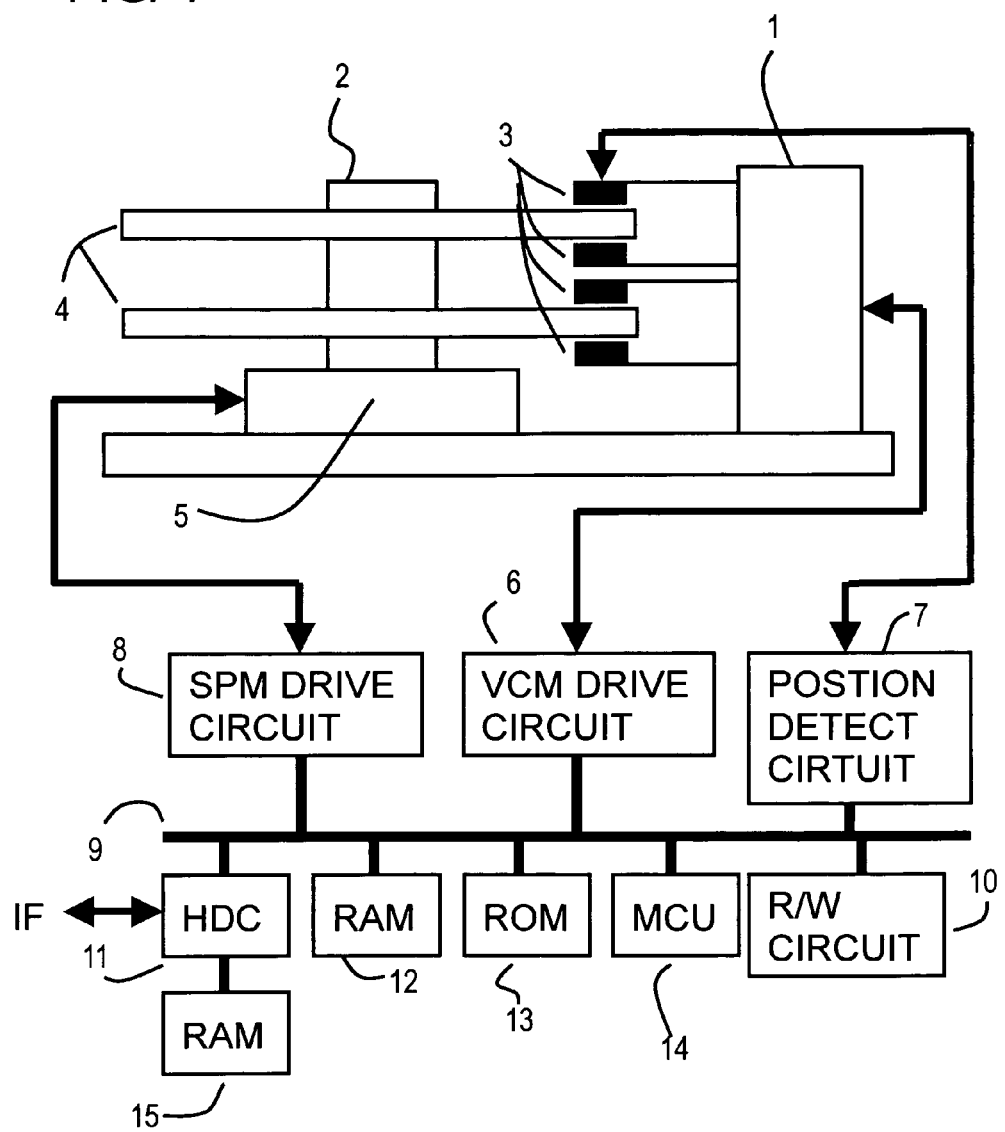
FIG. 1 is a block diagram depicting a disk device according to an embodiment of the present invention.
Figure 2:
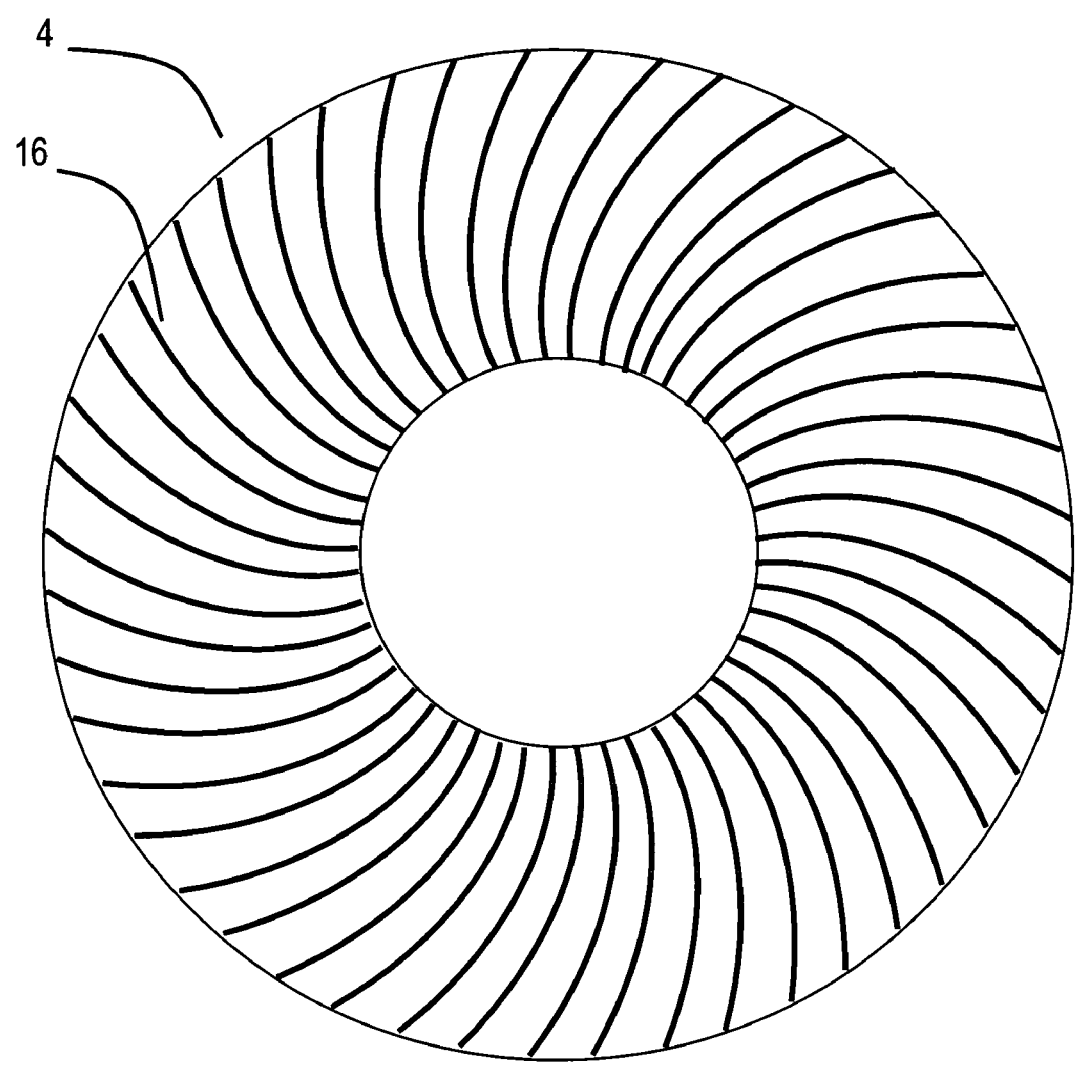
FIG. 2 is a diagram depicting the position signals of the disk in FIG. 1.
Figure 3:
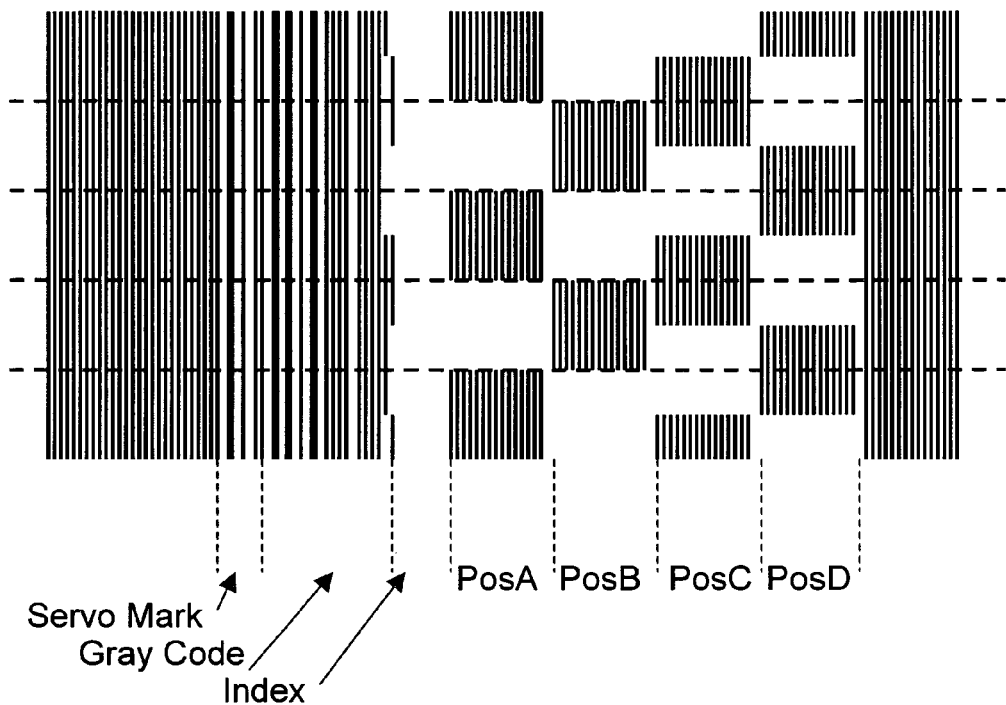
FIG. 3 is a diagram depicting details of the position signals in FIG. 2.

FIG. 1 is a block diagram depicting the disk device according to an embodiment of the present invention, FIG. 2 is a diagram depicting the arrangement of the position signals of the magnetic disk in FIG. 1, and FIG. 3 is a diagram depicting the position signals of the magnetic disk in FIG. 1 and FIG. 2.

FIG. 1 is a magnetic disk device as a disk device. As FIG. 1 shows, a magnetic disk 4, which is a magnetic storage medium, is installed at a rotation axis 2 of a spindle motor 5. The spindle motor 5 rotates a magnetic disk 4. an actuator (VCM) 1 has a magnetic head 3 at the tip, and moves the magnetic head 3 in the radius direction of the magnetic disk 4.

The actuator 1 is comprised of a voice coil motor (VCM) which rotates with the rotation axis as the center. In FIG. 1, two magnetic disks 4 are mounted on the magnetic disk device, and four magnetic heads 3 are simultaneously driven by the same actuator 1.

The magnetic head 3 has a read element and a write element. The magnetic head 3 is comprised of a read element, including a magneto-resistance (MR) element, stacked on the slider, and a write element, including the write coil, stacked thereon.

A position detection circuit 7 converts the position signals (analog signals) read by the magnetic head 3 into digital signals. A read/write (R/W) circuit 10 controls the read and write of the magnetic head 3. A spindle motor (SPM) drive circuit 8 drives the spindle motor 5. A voice coil motor (VCM) drive circuit 6 supplies the drive current to the voice coil motor (VCM) 1, and drives the VCM 1.

A microcontroller (MCU) 14 detects (demodulates) the current position from the digital position signals from the position detection circuit 7, and calculates the VCM drive instruction value according to the error between the detected current position and the target position. In other words, microcontroller 14 performs position demodulation and servo control including the disturbance suppression described in FIG. 4 and later. A read only memory (ROM) 13 stores the control program of the MCU 14. A random access memory (RAM) 12 stores the data for processing of the MCU 14.

A hard disk controller (HDC) 11 judges a position in one track based on the sector number of the servo signal, and records/reproduces the data. A random access memory (RAM) for the buffer 15 temporarily stores the read data or write data. The HDC 11 communicates with a host via an interface IF, such as USB (Universal Serial Bus), ATA or SCSI (Small Computer System Interface). A bus 9 connects these composing elements.

As FIG. 2 shows, on the magnetic disk 4, servo signals (position signals) 16 are arranged in each track in the circumference direction from the outer circumference to the inner circumference with an equal interval. Each track has a plurality of sectors, and the solid lines in FIG. 2 indicate a position where the servo signals 16 are recorded. As FIG. 3 shows, the position signal is comprised of a servo mark ServoMark, track number GrayCode, index Index, and offset information (servo burst) PosA, PosB, PosC and PosD. The dotted line in FIG. 3 shows the track center.

The position signals in FIG. 3 are read by the head 3, and the position of the magnetic head in the radius direction is detected using the track number GrayCode and the offset information PosA, PosB, PosC and PosD. Also the position of the magnetic head in the circumference direction is acquired based on the index signal Index.

For example, the sector number when the index signal is detected is set to No. 0, which is counted up every time the servo signal is detected, so as to acquire the sector number of each sector of the track. The sector number of the servo signal is used as a reference when data is recorded and reproduced. There is one index signal in one track. The sector number may be set instead of the index signal.

The MCU 14 in FIG. 1 confirms the position of the actuator 1 through the position detection circuit 7, performs servo computation, and supplies appropriate current to the VCM 1. In other words, in seek control, the head can be moved to the target position through the transition from coarse control, settling control and following control. In any case, the current position of the head must be detected.

To confirm a position like this, the servo signals are recorded on the magnetic disk in advance, as mentioned in FIG. 2. In other words, as FIG. 3 shows, servo marks, which indicate the start position of the servo signal, gray code which indicates the track number, index signal, and signals PosA to PosD which indicate the offset are recorded on the magnetic disk in advance. These signals are read by the magnetic head, and these servo signals are converted into digital values by the position detection circuit 7.

First Embodiment of Disturbance Observer

Figure 4:
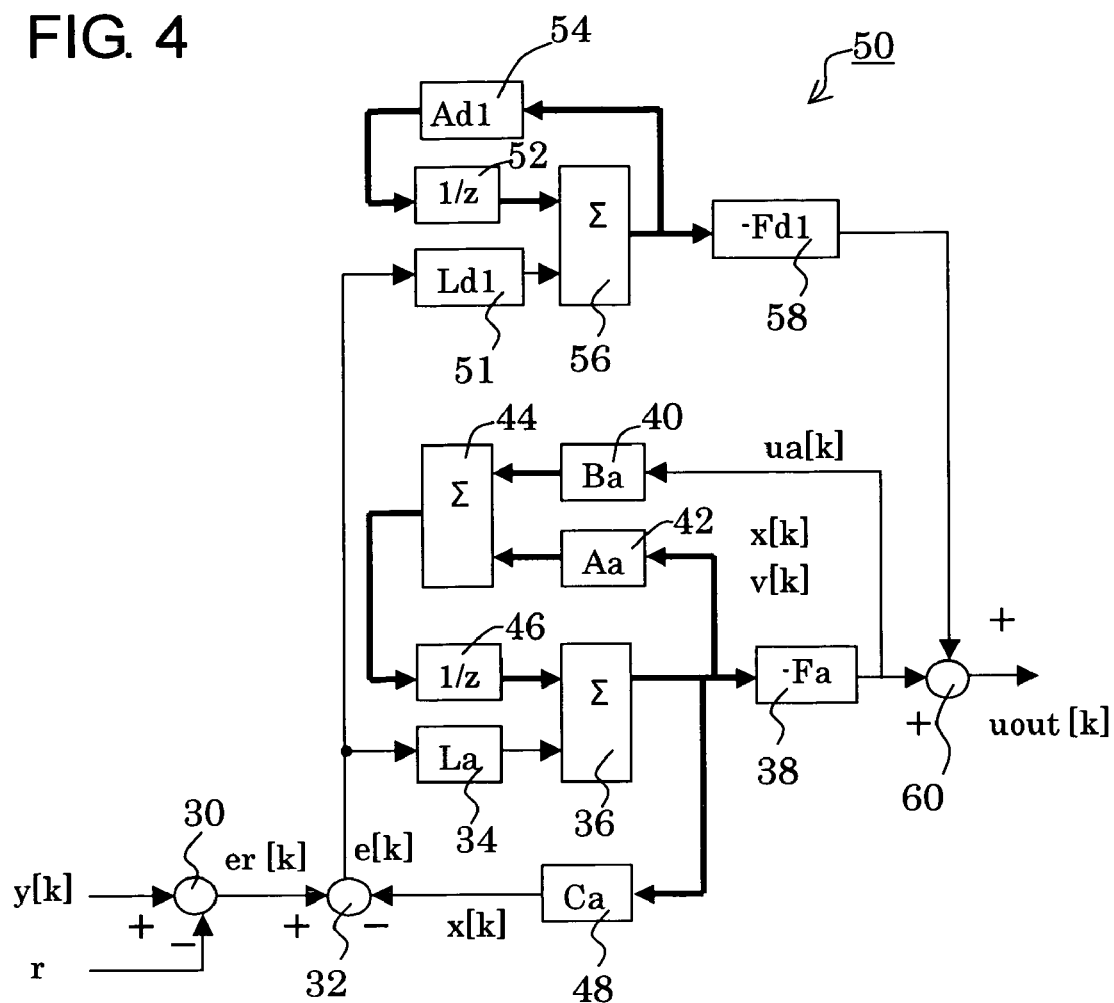
FIG. 4 is a block diagram depicting a disturbance observer control system according to an embodiment of the present invention.

FIG. 4 is a block diagram depicting a first embodiment of the positioning control system for suppressing the disturbance which is executed by the MCU 14 in FIG. 1. This positioning control system is an observer control system which detects the disturbance frequency and suppresses the disturbance.

The observer shown in FIG. 4 is a current observer including the bias compensation shown in the following Expressions (1), (2), (3), (4) and (5)

$$\begin{pmatrix} x(k) \\ v(k) \\ b(k) \\ z1(k) \\ z2(k) \end{pmatrix} = \begin{pmatrix} x(k) \\ v(k) \\ b(k) \\ z1(k) \\ z2(k) \end{pmatrix} + \begin{pmatrix} L1 \\ L2 \\ L3 \\ L4 \\ L5 \end{pmatrix} (y(k) - x(k)) \quad (1)$$

$$u(k) = -(F1 \quad F2)\begin{pmatrix} x(k) \\ v(k) \end{pmatrix} \quad (2)$$

$$uout(k) = u(k) - (F3 \quad F4 \quad F5)\begin{pmatrix} b(k) \\ z1(k) \\ z2(k) \end{pmatrix} \quad (3)$$

$$\begin{pmatrix} x(k+1) \\ v(k+1) \end{pmatrix} = \begin{pmatrix} 1 & 1 \\ 0 & 1 \end{pmatrix}\begin{pmatrix} x(k) \\ v(k) \end{pmatrix} + \frac{Bl}{m}\frac{1}{Lp}T^2\begin{pmatrix} 1/2 \\ 1 \end{pmatrix}u(k) \quad (4)$$

$$\begin{aligned} b(k+1) &= b(k) \\ \begin{pmatrix} z1(k+1) \\ z2(k+1) \end{pmatrix} &= \begin{pmatrix} a11 & a12 \\ a21 & a22 \end{pmatrix}\begin{pmatrix} z1(k) \\ z2(k) \end{pmatrix} \end{aligned} \quad (5)$$

In other words, this embodiment is an example of a control system where the disturbance model 50 is separated from the model of the controller. In FIG. 4, the first computing block 30 subtracts the target position "r" from the observation position y [k] which is acquired by demodulating the servo information read by the head 3, to compute the actual position error er [k]. The second computing block 32 subtracts the estimated position x [k] of the observer from the actual position error er [k] to compute the estimated position error e [k].

In the controller model, this estimated position error e [k] is input to the state estimation block 34, and computes the estimated correction value (right hand side of Expression (1)) using the estimated gain La (L1, L2) of the controller. Then the result is added to state quantity (left hand side of Expression (1)) x [k] and v [k] from the delay block 46 in the addition block 36, and the estimated position x [k] and estimated velocity v [k] are acquired as Expression (1) shows. In Expression (1), the estimated position error e [k] is indicated as (y [k]−x [k]).

The estimated values x [k] and v [k] are multiplied by the state feed back gain (−Fa=F1, F2) in the fourth computing block 38, and the first drive value u [k] of the actuator 1 is acquired as shown in Expression (2). On the other hand, the estimated values x [k] and v [k] of Expression (1) from the addition block 36 are multiplied by the estimated gain Aa (matrix (1, 0) of 2×2 in Expression (4)) in the fifth computing block 42, and the drive value u [k] in the fourth computing block 38 is multiplied by the estimated gain Ba (a value by which u [k] in Expression (4) is multiplied] in the sixth computing block 40. Both of the multiplication results are added in the addition block 44, and the estimated state quantity x [k+1] and v [k+1] of the next sample in Expression (4) are acquired.

The estimated state quantity of the next sample is input to the delay block 46, as mentioned above, and is corrected by the estimated correction value in the state estimation block 34. And for the estimated value of Expression (1) from the addition block 36, the estimated position x [k] is acquired in the seventh computing block 48, and is input to the above mentioned second computing block 32.

In the disturbance model 50, on the other hand, the estimated position error e [k] is input to the disturbance state estimation block 51, and the estimated correction value (right hand side of Expression (1)) is computed using the estimated gain Ld1 (L3, L4, L5). And the result is added with the state quantity (left hand side of Expression (1)) from the delay block 52 in the addition block 56, and the estimated bias value b [k] and the estimated disturbance suppression values z1 [k] and z2 [k] are acquired, as shown in Expression (1).

The estimated values b [k], z1 [k] and z2 [k] are multiplied by the state feed back gain (Fd1=F3, F4, F5) in the eighth computing block 58, and the disturbance suppression drive value of the actuator 1 is acquired as shown in Expression (3). The estimated values b [k], z1 [k] and z2 [k] of Expression (1) from the addition block 56, on the other hand, are multiplied by the estimated gain Ad1 (gain of b [k] and the gain of the matrix A of 2×2 in Expression (5)) in the ninth computing block 54, and the result is input to the delay block 52 to acquire the estimated values b [k+1], z1 [k+1] and z2 [k+1] of the next sample.

And the disturbance suppression drive value is subtracted from the drive value u [k] in the addition block 60 to acquire the output drive value uout [k] of Expression (3).

In other words, the estimated gain L is separated for the controller model and disturbance model, and the feed back gain F is separated for the controller model and disturbance model, so that the controller model and disturbance model are separately designed.

Design Method for Observer

Now the design method for an observer, where the disturbance model is separated, will be described with reference to FIG. 5 and FIG. 6.

First the first design method will be described with reference to FIG. 5.

(S10) The original controller is designed by the observer control. In other words, the control target model is set.

(S12) Then the filter form for shaping is determined. In other words, the number of shaping filters, and the pole and zero point of an individual filter are set. For the filter form for shaping, the degree of numerator and denominator are the same in the linear filter or quadratic filter.

(S14) Then using the zero point of the shaping filter, a disturbance model of which denominator is the expression of the numerator of the filter is constructed.

(S16) This disturbance model is added to the model of the observer in step S10. Adding this disturbance model means specifying the zero point of the sensitivity function.

(S18) Then the poles of the entire observer control system are specified. The poles include the poles used for original design and poles of the filter for shaping. In other words, the pole positioning is performed for the expanded model (entire model) including the pole of the shaping filter, and estimated gains L1 to L5 of the observer and matrix A are designed.

(S20) Pole positioning is performed only for the control target model, and the state feed back gain F is designed.

(S22) The output gain of the disturbance model is added to the state feed back gain, and the feed back gain of the integrated model is designed. In this way, the observer including the disturbance model is designed.

In other words, in the present invention, the performance of suppressing position disturbance, external vibration and impact are judged by the sensitivity function and acceleration disturbance characteristics. Therefore a desired disturbance suppression function is assigned by designing the form of the sensitivity function and acceleration disturbance characteristics.

Now the design procedure will be described using examples. First the observer control system when the actuator 1 is a double integral model is given by the analog expression in Expression (6).

$$s\begin{pmatrix}x\\v\end{pmatrix} = \begin{pmatrix}0 & 1\\0 & 0\end{pmatrix}\begin{pmatrix}x\\v\end{pmatrix} + \frac{Bl}{m}\begin{pmatrix}0\\1\end{pmatrix}u + \begin{pmatrix}L1\\L2\end{pmatrix}(y-x) \quad (6)$$

$$y = (1\ 0)\begin{pmatrix}x\\v\end{pmatrix}$$

$$u = -(Fx\ Fv)\begin{pmatrix}x\\v\end{pmatrix}$$

In Expression (6), s is a Laplace operator, x is an estimated position, v is an estimated velocity, y is a current position, r is a target position, L1 and L2 are estimated gain of position and velocity, u is drive current, and B1/m is a force constant of the actuator 1.

For the sensitivity function 1/(1+CP) of this control system, disturbance suppression is defined by the linear filter of the following Expression (7), so as to shape the sensitivity function by this linear filter.

$$\frac{s+\omega_1}{s+\omega_2} \quad (7)$$

In other words, the sensitivity function when this filter is provided has a form when 1/(1+CP) is multiplied by Expression (7).

As a disturbance model, a model of the transfer function of the following Expression (8) of which denominator is the numerator of the filter of Expression (7) is provided to the observer.

$$\frac{1}{s+\omega_1} \quad (8)$$

The denominator ($\omega_2$) of the filter of Expression (7) is used for pole positioning.

By providing this disturbance model to the observer of Expression (6), the following Expression (9) is acquired from Expression (6).

$$s\begin{pmatrix}x\\v\\b\end{pmatrix} = \begin{pmatrix}0 & 1 & 0\\0 & 0 & 1\\0 & -\omega_1 & 0\end{pmatrix}\begin{pmatrix}x\\v\\b\end{pmatrix} + \frac{Bl}{m}\begin{pmatrix}0\\1\\0\end{pmatrix}u + \begin{pmatrix}L1\\L2\\L3\end{pmatrix}(y-x) \quad (9)$$

$$y = (1\ 0\ 0)\begin{pmatrix}x\\v\\b\end{pmatrix}$$

$$u = -(Fx\ Fv\ K)\begin{pmatrix}x\\v\\b\end{pmatrix}$$

$$K = \frac{m}{Bl}$$

In the Expression (9), "b" is an estimated disturbance value, and is indicated by a parameter of a steady bias estimation value in this example. In order to design estimated gains L1, l2 and L3 of the observer in Expression (9), a pole used for the design of the original observer in Expression (6) and a pole (denominator): $-\omega_2$ of the shaping filter in Expression (7) are specified.

In Expression (9), only (Fx, Fv) is designed for feed back gain. The disturbance model is observable but not controllable, so the feed back gain of the disturbance model cannot be changed. For the disturbance model, the same one as the one used for designing the estimated gain of the observer is specified. In Expression (9), the feed back gain (output gain) of the disturbance model is $K=m/Bl$.

In this way, an original controller is designed by observer control, and the filter form for shaping according to the disturbance frequency to be suppressed is determined. Here the shaping filter is a linear or quadratic filter, and the degrees of numerator and denominator must be the same. If the degrees of the numerator and denominator of the filter are different, that is if the degree of denominator is greater than the degree of numerator ($\omega 1/(s+\omega 2)$), for example, the frequency characteristic of this filter is that gain decreases as the frequency range becomes higher, and if the original sensitivity function is multiplied by this gain, the original sensitivity function (that is characteristics of the controller) changes considerably.

And a disturbance model of which denominator is the expression of the numerator of the filter is constructed and added to the model of the observer (Expression (9)). Adding this disturbance model means specifying the zero point of the sensitivity function.

Then the poles of the entire observer control system are specified. These poles include the poles used for the model of the original controller and the pole of the filter for shaping ($-\omega 2$).

In other words, the frequency characteristics to be introduced for suppressing disturbance is defined by the shaping filter, a disturbance model of which denominator is the expression of numerator of the shaping filter is constructed and is added to the model of the original observer. Because of this, the disturbance model can be provided without affecting the characteristics of the original controller, even when the suppression width is wide, or when disturbance in a high frequency range is suppressed.

Even when the disturbance suppression function is added after one observer is designed, the shift of characteristics of the entire control system is small, and it is unnecessary to redesign the entire observer.

Now the case when the shaping filter is a quadratic filter will be described. The quadratic filter is defined by the following Expression (10).

$$\frac{s^2 + 2\zeta_1\omega_1 s + \omega_1^2}{s^2 + 2\zeta_2\omega_2 s + \omega_2^2} \quad (10)$$

As described above, the disturbance model, of which denominator is the expression of the numerator of the shaping filter, is given by the following Expression (11).

$$\frac{1}{s^2 + 2\zeta_1\omega_1 s + \omega_1^2} \quad (11)$$

There are three possible methods that can be used to provide this disturbance model to the observer of the original controller (Expression (6)).

The first method is directly providing the disturbance model of Expression (11), just like Expression (9). In other words, if the state estimation quantity of disturbance is z1 and z2, and the estimated gain of the disturbance is L3 and L4, since this is a quadratic filter, then Expression (12) is acquired.

$$s\begin{pmatrix} x \\ v \\ z1 \\ z2 \end{pmatrix} = \begin{pmatrix} 0 & 1 & 0 & 0 \\ 0 & 0 & 1 & 0 \\ 0 & 0 & 0 & 1 \\ 0 & 0 & -\omega_1^2 & -2\zeta_1\omega_1 \end{pmatrix}\begin{pmatrix} x \\ v \\ z1 \\ z2 \end{pmatrix} + \frac{Bl}{m}\begin{pmatrix} 0 \\ 1 \\ 0 \\ 0 \end{pmatrix}u + \begin{pmatrix} L1 \\ L2 \\ L3 \\ L4 \\ L5 \end{pmatrix}(y-x) \quad (12)$$

$$y = (1\ 0\ 0\ 0)\begin{pmatrix} x \\ v \\ z1 \\ z2 \end{pmatrix}$$

$$u = -(Fx\ Fv\ K\ 0)\begin{pmatrix} x \\ v \\ z1 \\ z2 \end{pmatrix}$$

$$K = \frac{m}{Bl}$$

The second method is transforming Expression (12) by dispersing the term of the square of $\omega 1$, and acquiring Expression (13).

$$s\begin{pmatrix} x \\ v \\ z1 \\ z2 \end{pmatrix} = \begin{pmatrix} 0 & 1 & 0 & 0 \\ 0 & 0 & 1 & 0 \\ 0 & 0 & 0 & \omega_1 \\ 0 & 0 & -\omega_1 & -2\zeta_1\omega_1 \end{pmatrix}\begin{pmatrix} x \\ v \\ z1 \\ z2 \end{pmatrix} + \frac{Bl}{m}\begin{pmatrix} 0 \\ 1 \\ 0 \\ 0 \end{pmatrix}u + \begin{pmatrix} L1 \\ L2 \\ L3 \\ L4 \\ L5 \end{pmatrix}(y-x) \quad (13)$$

$$y = (1\ 0\ 0\ 0)\begin{pmatrix} x \\ v \\ z1 \\ z2 \end{pmatrix}$$

$$u = -(Fx\ Fv\ K\ 0)\begin{pmatrix} x \\ v \\ z1 \\ z2 \end{pmatrix}$$

$$K = \frac{m}{Bl}$$

The third method is inverting the sign of $\omega 1$ in Expression (13) and acquiring Expression (14).

$$s\begin{pmatrix} x \\ v \\ z1 \\ z2 \end{pmatrix} = \begin{pmatrix} 0 & 1 & 0 & 0 \\ 0 & 0 & 1 & 0 \\ 0 & 0 & 0 & -\omega_1 \\ 0 & 0 & \omega_1 & -2\zeta_1\omega_1 \end{pmatrix}\begin{pmatrix} x \\ v \\ z1 \\ z2 \end{pmatrix} + \frac{Bl}{m}\begin{pmatrix} 0 \\ 1 \\ 0 \\ 0 \end{pmatrix}u + \begin{pmatrix} L1 \\ L2 \\ L3 \\ L4 \end{pmatrix}(y-x) \quad (14)$$

$$y = (1\ 0\ 0\ 0)\begin{pmatrix} x \\ v \\ z1 \\ z2 \end{pmatrix}$$

$$u = -(Fx\ Fv\ K\ 0)\begin{pmatrix} x \\ v \\ z1 \\ z2 \end{pmatrix}$$

$$K = \frac{m}{Bl}$$

Design is possible with any of the above methods. The second method and third method are effective particularly when the model is converted into a digital control system. In other words, two state variables z1 and z2 are balanced and the values of the estimated gains L3 and L4 of the observer for the two state variables do not become very far apart.

At this time, for the poles, both the pole of the shaping filter of Expression (10) (derived from denominator=0 of Expression (10)) and the pole used for design of the original observer control system are specified, and the values L1, L2, L3 and L4 are designed.

The observer control system integrating this quadratic filter shaping and conventional steady bias estimation is given by the following Expression (15).

$$s\begin{pmatrix} x \\ v \\ b \\ z1 \\ z2 \end{pmatrix} = \begin{pmatrix} 0 & 1 & 0 & 0 & 0 \\ 0 & 0 & 1 & 1 & 0 \\ 0 & 0 & 0 & 0 & 0 \\ 0 & 0 & 0 & 0 & \omega_1 \\ 0 & 0 & 0 & -\omega_1 & -2\zeta_1\omega_1 \end{pmatrix} \begin{pmatrix} x \\ v \\ b \\ z1 \\ z2 \end{pmatrix} + \frac{Bl}{m}\begin{pmatrix} 0 \\ 1 \\ 0 \\ 0 \\ 0 \end{pmatrix} u + \begin{pmatrix} L1 \\ L2 \\ L3 \\ L4 \\ L5 \end{pmatrix}(y-x)$$

$$y = (1\ 0\ 0\ 0\ 0)\begin{pmatrix} x \\ v \\ b \\ z1 \\ z2 \end{pmatrix}$$

$$u = -(Fx\ Fv\ K\ K\ 0)\begin{pmatrix} x \\ v \\ b \\ z1 \\ z2 \end{pmatrix}$$

$$K = \frac{m}{Bl}$$

(15)

In this way, the filter form for shaping can be considered first, and then the disturbance model can be added to the observer during designing. Therefore shaping in free form is possible without being restricted by the physical response characteristics of the original disturbance model.

Figure 5:
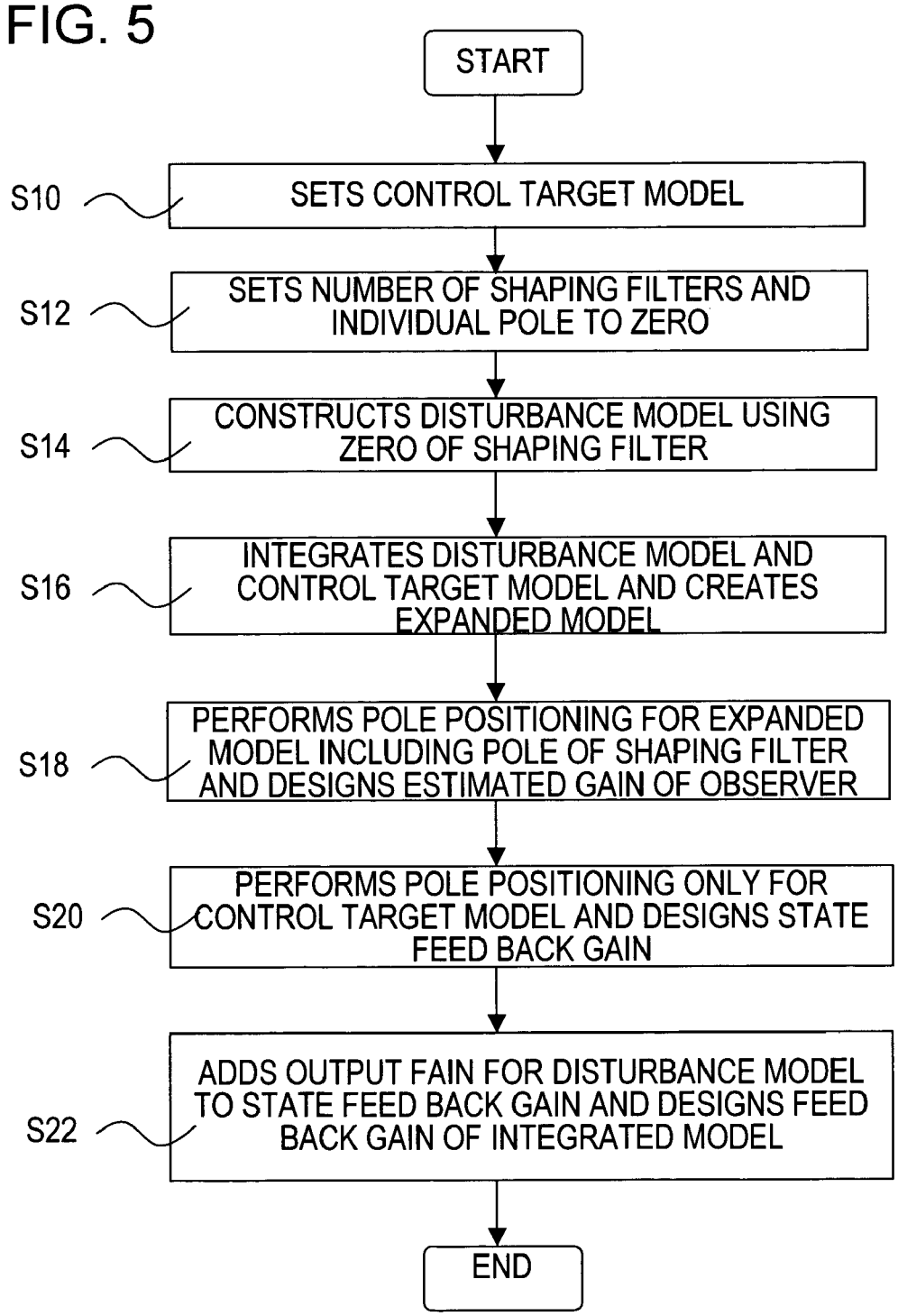
FIG. 5 is a flow chart depicting the analog design procedure of the disturbance observer in FIG. 4.

FIG. 5 is a description of analog design. To design a digital control system, on the other hand, the design flow in FIG. 6 is used.

Figure 6:
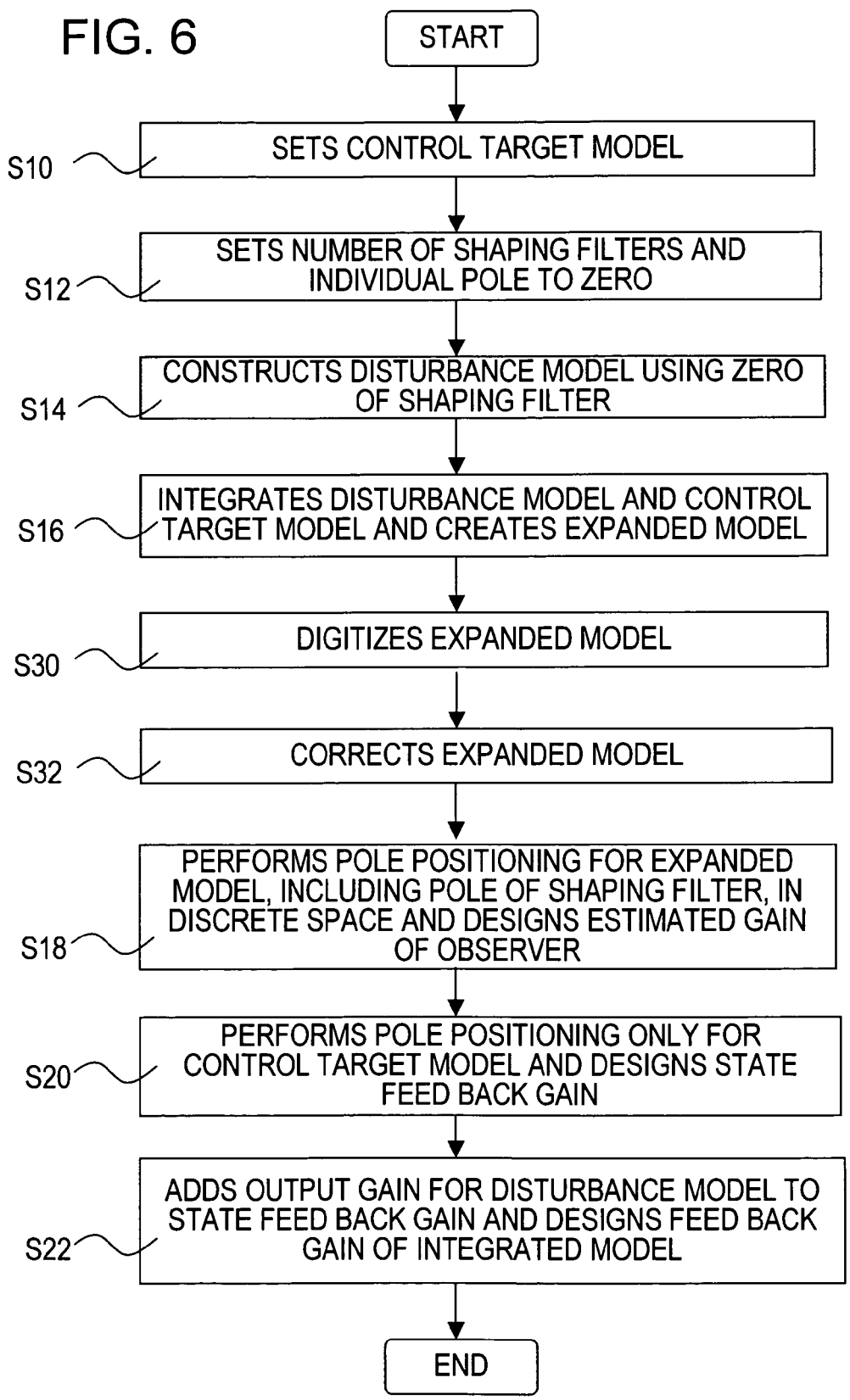
FIG. 6 is a flow chart depicting the digital design procedure of the disturbance observer in FIG. 4.

In FIG. 6, steps the same as the steps in FIG. 5 are denoted with the same reference symbols. As FIG. 6 shows, the disturbance model is modeled in an analog space in step S16 and the expanded model is constructed. After the expanded model is converted into digital space (digitized) in step S30, pole positioning is specified in the digital space in step S18.

In the case when the disturbance model has the characteristics of the quadratic filter, if the expanded model is converted into a discrete system, both two variables z1 and z2 of the disturbance model influence the actuator 1 in the matrix A for designing the estimated gain of the observer.

So it is corrected such that only one variable of the disturbance model influences the actuator 1 or, to be more specific, only a variable the same as the analog design influences the actuator 1. In other words, after digitizing, the expanded model is corrected in step S32.

Specifically, if the analog model of Expression (13) using the quadratic filter is digitized (z transformation, then transformed into SI units), then Expression (16) is acquired.

$$z\begin{pmatrix} x[k] \\ v[k] \\ z1[k] \\ z2[k] \end{pmatrix} = \begin{pmatrix} 1 & T & A13 & A14 \\ 0 & 1 & A23 & A24 \\ 0 & 0 & A33 & A34 \\ 0 & 0 & A43 & A44 \end{pmatrix}\begin{pmatrix} x[k] \\ v[k] \\ z1[k] \\ z2[k] \end{pmatrix} + \frac{Bl}{m}\begin{pmatrix} T^2/2 \\ T \\ 0 \\ 0 \end{pmatrix}u[k]$$

$$y = (1\ 0\ 0\ 0)\begin{pmatrix} x[k] \\ v[k] \\ z1[k] \\ z2[k] \end{pmatrix}$$

(16)

In Expression (16), z is the Z transformer, and T is a sampling period. Matrices A, that is A13, A14, A23 and A24 must be focused on here. Neither A14 nor A24 become "0" by digitizing. In other words, in matrix A for designing the estimated gain of the observer, both of the two variables z1 and z2 of the disturbance model influence the actuator 1.

Therefore after digitizing the analog model, the coefficients of matrix A, with which the state variables z1 and z2 of the disturbance model influence the actuator 1, are replaced.

In the case of the example in Expression (16), matrix A is corrected to be the following Expression (17).

$$\begin{rcases} A14 = A24 = 0 \\ A13 = T^2/2 \\ A23 = T \end{rcases}$$

(17)

Also in the digital control system, the unit of distance is a track, the current value is normalized with the maximum current as "1", and the velocity and acceleration are normalized not in seconds by in sampling frequency. In the same way, the analog format observer in Expression (15) is converted to the current observer format, then Expression (18) is acquired.

$$\begin{pmatrix} x(k) \\ v(k) \\ b(k) \\ z1(k) \\ z2(k) \end{pmatrix} = \begin{pmatrix} x(k) \\ v(k) \\ b(k) \\ z1(k) \\ z2(k) \end{pmatrix} + \begin{pmatrix} L1 \\ L2 \\ L3 \\ L4 \\ L5 \end{pmatrix}(y(k) - x(k))$$

$$u(k) = -(F1\ F2\ F3\ F4\ F5)\begin{pmatrix} x(k) \\ v(k) \\ b(k) \\ z1(k) \\ z2(k) \end{pmatrix}$$

$$\begin{pmatrix} x(k+1) \\ v(k+1) \\ b(k+1) \\ z1(k+1) \\ z2(k+1) \end{pmatrix} = \begin{pmatrix} 1 & 1 & 1/2 & 1/2 & 0 \\ 0 & 1 & 1 & 1 & 0 \\ 0 & 0 & 1 & 0 & 0 \\ 0 & 0 & 0 & a11 & a12 \\ 0 & 0 & 0 & a21 & a22 \end{pmatrix}\begin{pmatrix} x(k) \\ v(k) \\ b(k) \\ z1(k) \\ z2(k) \end{pmatrix} + \frac{Bl}{m}\frac{1}{Lp}T^2\begin{pmatrix} 1/2 \\ 1 \\ 0 \\ 0 \\ 0 \end{pmatrix}u(k)$$

(18)

In this way, if the disturbance model is designed to be a configuration in which the disturbance model can be separated, Expression (18) can be provided for the disturbance model separately, as shown in FIG. 4.

In other words, comparing Expression (18) and Expressions (1) to (5), Expressions (2) and (4) are Expression (18) in which the controller model is independent, and Expressions (3) and (5) are Expression (18) in which the disturbance model 50 is separated.

Examples of First Embodiment

Figure 7:
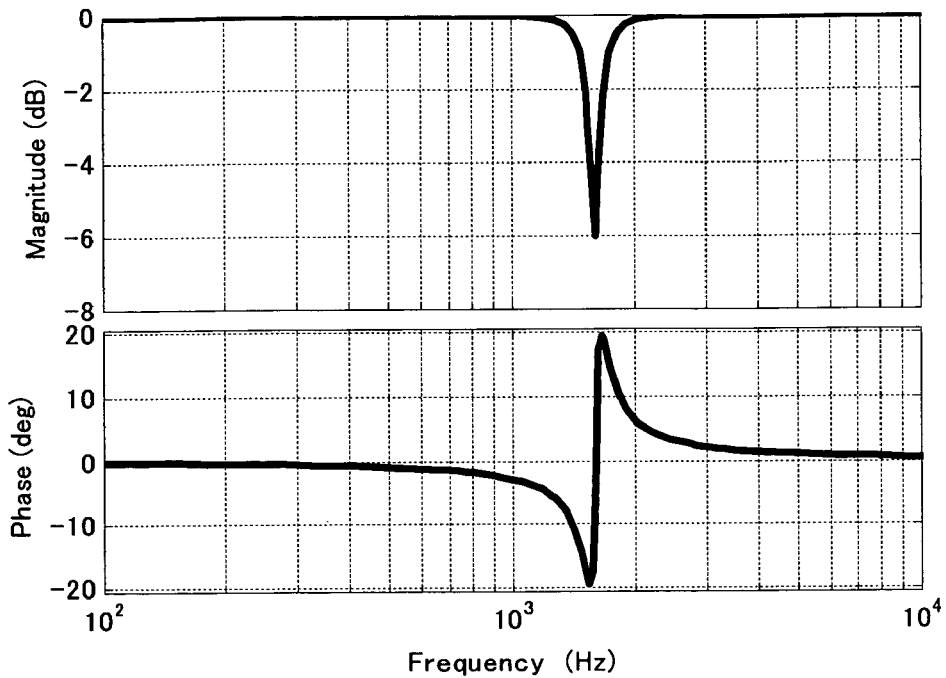
FIG. 7 is characteristic diagrams of a shaping filter of the first example of the embodiment in FIG. 4.
Figure 8:
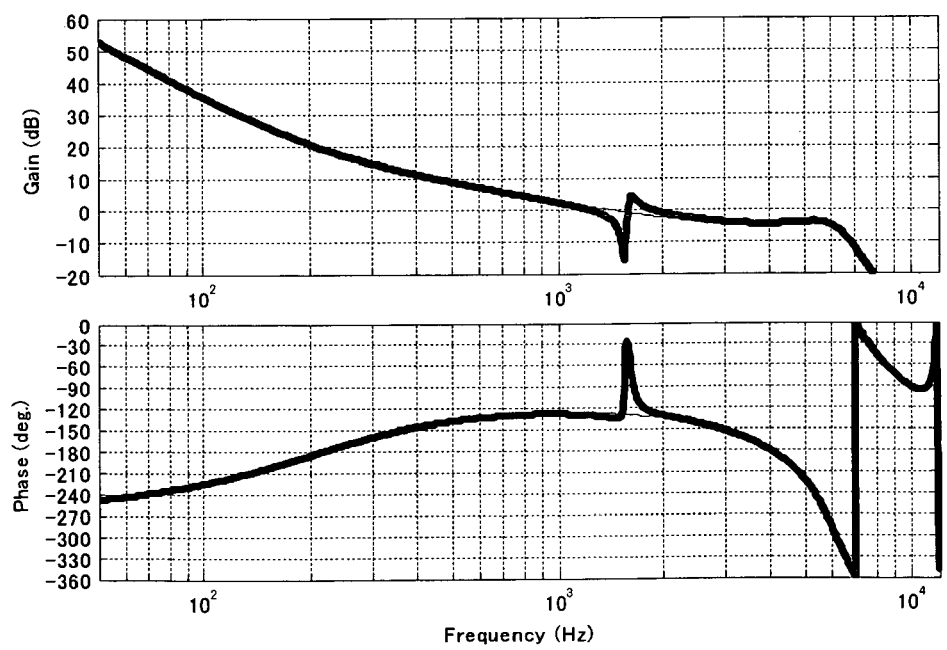
FIG. 8 is characteristic diagrams of the open loop of the first example of the embodiment in FIG. 4.
Figure 9:
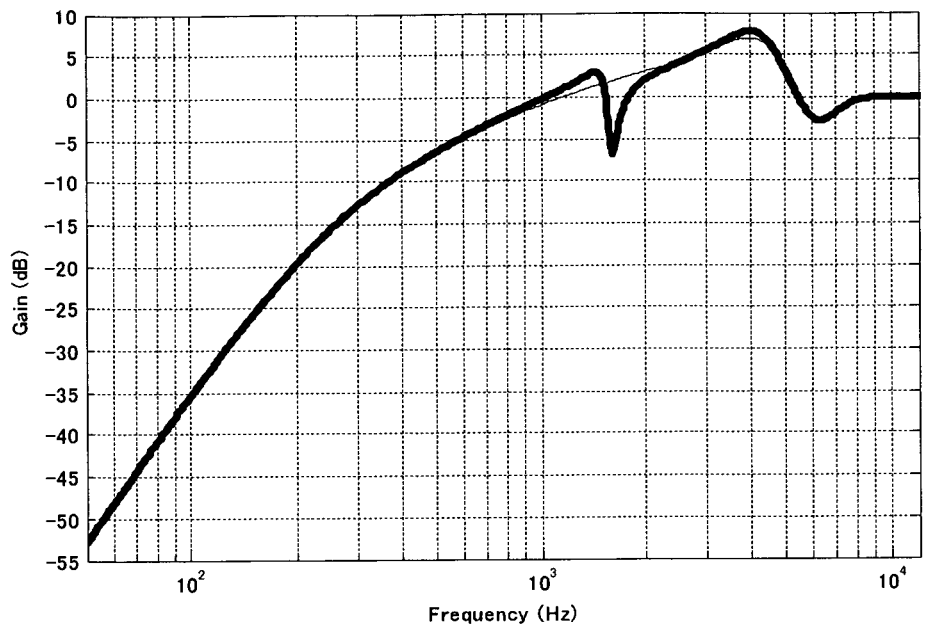
FIG. 9 is a characteristic diagram of the sensitivity function of the first example of the embodiment in FIG. 4.
Figure 10:
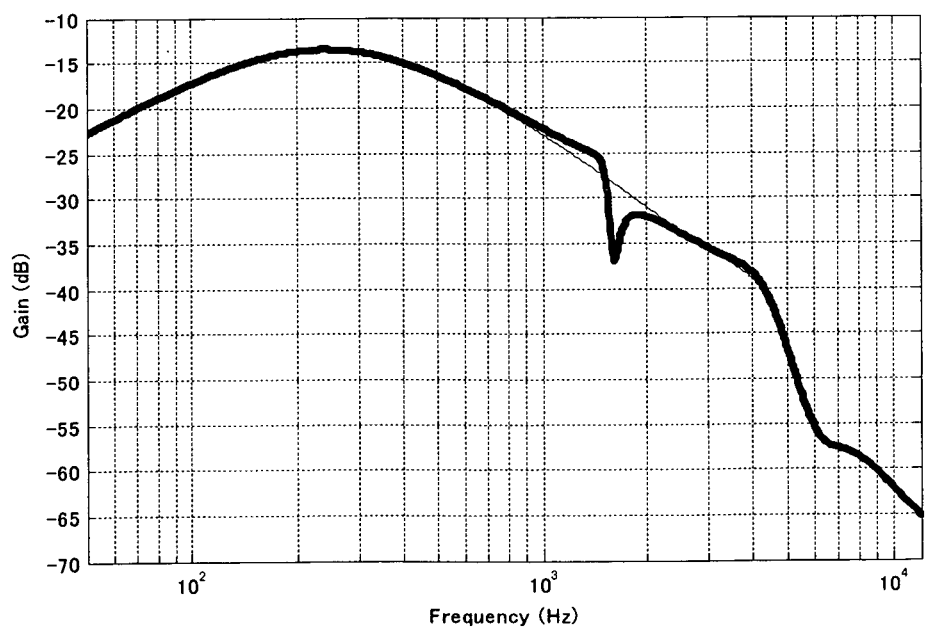
FIG. 10 is a characteristic diagram of the acceleration disturbance of the first example of the embodiment in FIG. 4.

FIG. 7 to FIG. 10 are diagrams depicting the first example of the first embodiment of the present invention, where FIG. 7 is characteristic diagrams of the shaping filter, FIG. 8 is open loop characteristic diagrams, FIG. 9 is a characteristic diagram of the sensitivity function, and FIG. 10 is a characteristic diagram of acceleration disturbance.

FIG. 7 to FIG. 10 are examples of suppressing 1600 Hz to be a notch form. The high frequency range must be suppressed in the case when the high frequency range is applied due to the vibration of the disk medium or excitation by wind of the head suspension. Particularly if the rotational frequency of the disk medium is high, the influence of this frequency disturbance in a high frequency range becomes conspicuous in a device having high track density.

In the case of such a high frequency range, it is difficult to suppress disturbance even if the reverse characteristic of the notch filter is inserted in the controller in series. Also as the gain characteristic shows, trial and error is required to adjust filter coefficients to implement characteristics of lowering the gain then raising the gain.

In the present embodiment, a shaping filter for suppressing only a specific frequency is designed, as shown in FIG. 7. This shaping filter is designed by the quadratic filter shown in Expression (10). In Expression (10), $\omega 1=2\pi*1600$, $\omega 2=\omega 1$, $\zeta 1=0.025$ and $\zeta 2=0.05$.

For the frequency characteristics of this shaping filter, the gain is suppressed around 1600 Hz, and the phase drops once around 1600 Hz and then rises, as shown in the frequency vs. gain characteristics in the top graph and in the frequency vs. phase characteristics in the bottom graph in FIG. 7.

The above mentioned observer is constructed using the shaping filter designed like this. For the open loop characteristics of the control system constructed by this observer, the gain is dropped at 1600 Hz and phase is raised at around 1600 Hz, as shown in the frequency vs. gain characteristics in the top graph and in the frequency vs. phase characteristics in the bottom graph in FIG. 8.

Therefore for the sensitivity function of the control system, the gain is suppressed at around 1600 Hz, as shown in the frequency vs. gain characteristics in FIG. 9. For acceleration disturbance characteristics of the control system as well, the gain is suppressed at around 1600 Hz, as shown in the frequency vs. gain characteristics in FIG. 10.

Figure 11:
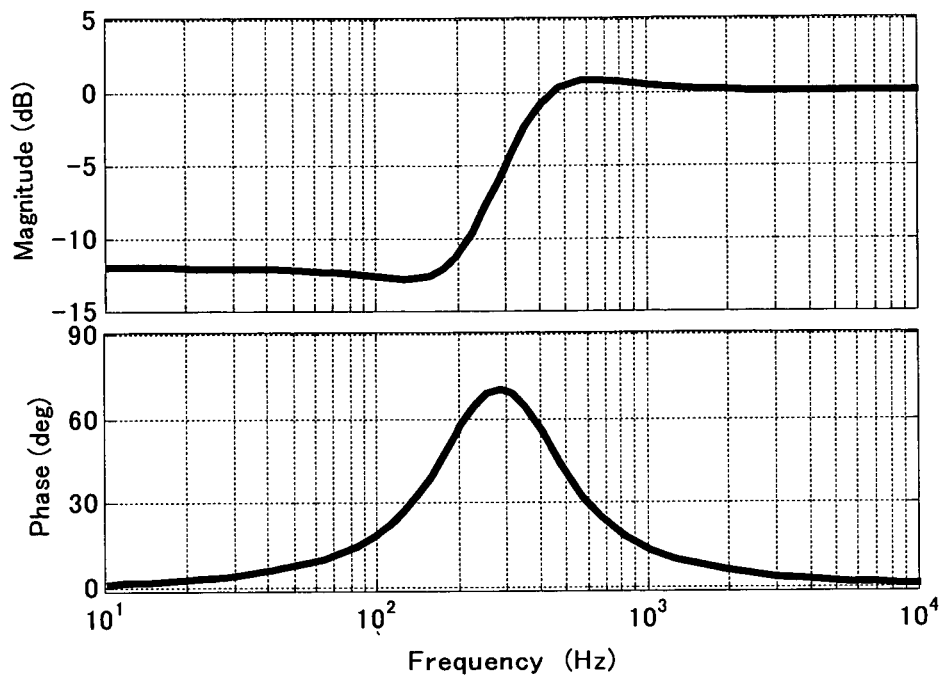
FIG. 11 is characteristic diagrams of the shaping filter of the second example of the embodiment in FIG. 4.
Figure 12:
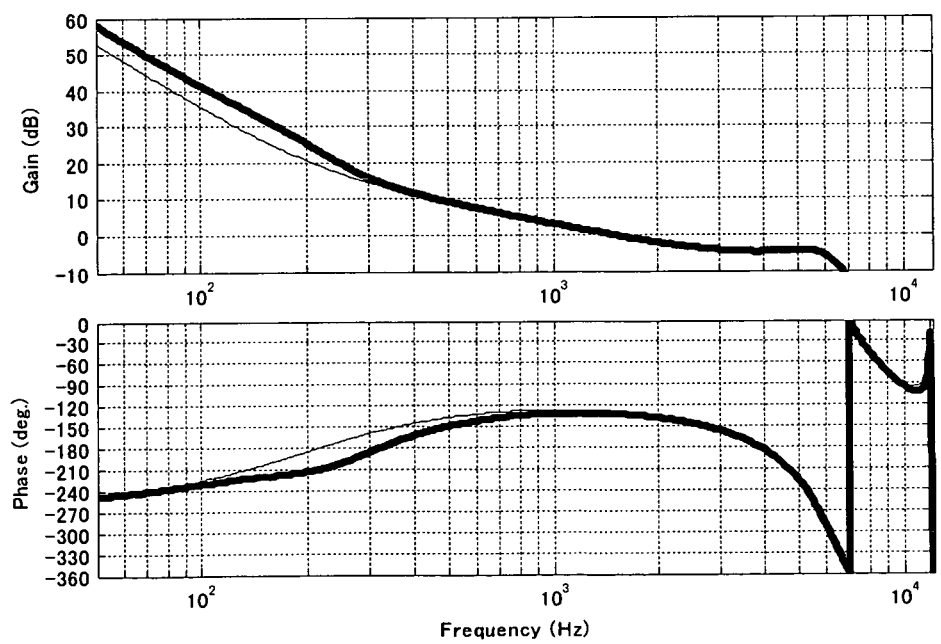
FIG. 12 is a characteristic diagram of the open loop of the second example of the embodiment in FIG. 4.
Figure 13:
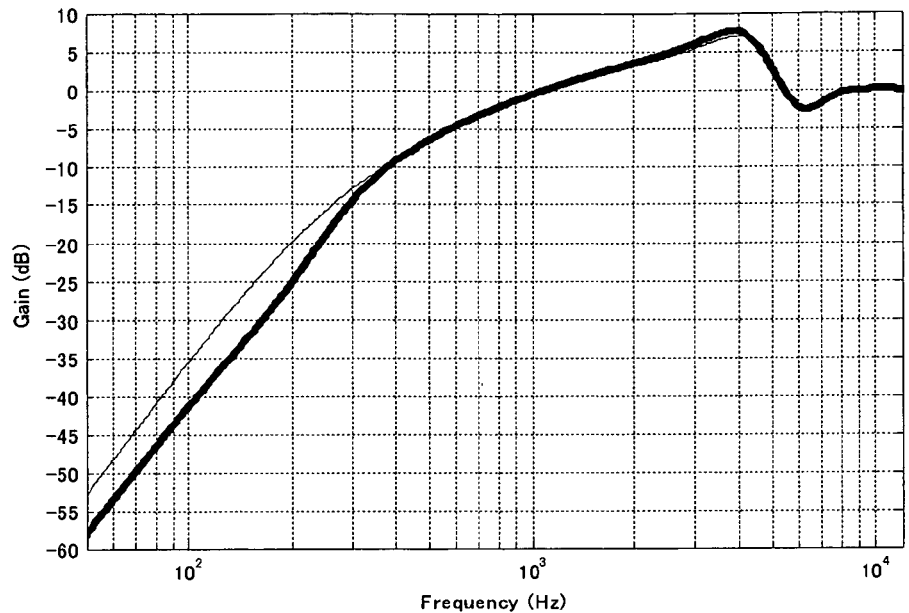
FIG. 13 is a characteristic diagram of the sensitivity function of the second example of the embodiment in FIG. 4.
Figure 14:
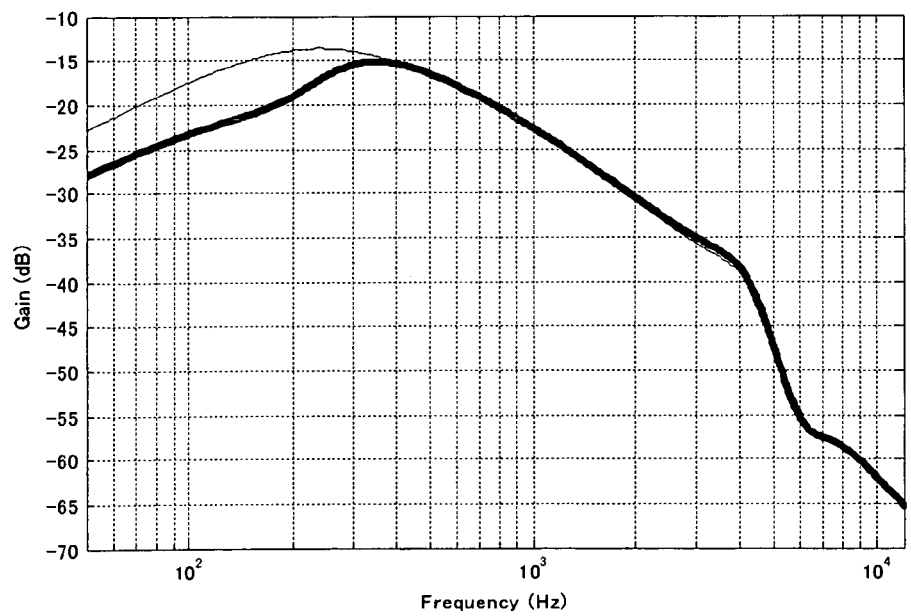
FIG. 14 is a characteristic diagram of the acceleration disturbance of the second example of the embodiment in FIG. 4, and is a characteristic diagram of the sensitivity function of FIG. 5 of the first example in the example of FIG. 4.

FIG. 11 to FIG. 14 are diagrams depicting the second example of the first embodiment of the present invention, where FIG. 11 is characteristic diagrams of the shaping filter, FIG. 12 is open loop characteristic diagrams, FIG. 13 is a characteristic diagram of the sensitivity function, and FIG. 14 is a characteristic diagram of acceleration disturbance.

FIG. 11 to FIG. 14 are examples of suppressing the low frequency range uniformly. The low frequency range must be uniformly suppressed in the case when the suppression width to external vibration is wide in addition to the eccentricity of the disk medium. Many external vibration components in the low frequency range exist, and the influence thereof is conspicuous. It is difficult for a conventional observer to implement a wide suppression width in the low frequency range.

In the present embodiment, a shaping filter for suppressing low frequency in a wide range is designed, as shown in FIG. 11. This shaping filter is designed by the quadratic filter shown in Expression (10). In the case of this shaping filter, $\omega 1=2\pi*200$, $\omega 2=2\pi*400$, $\zeta 1=0.5$ and $\zeta 2=0.5$ in Expression (10).

For the frequency characteristics of this shaping filter, the gain gradually increases when the frequency exceeds the lower limit (100 Hz) in the low frequency range, and becomes roughly constant at the upper limit (around 500 Hz in this case) in the low frequency range, and the phase forms a peak between the lower limit (100 Hz) of the low frequency range and the upper limit (about 500 Hz in this case) in the low frequency range, as shown in the frequency vs. gain characteristics in the top graph and the frequency vs. phase characteristics in the bottom graph in FIG. 11.

The above mentioned observer is constructed using the shaping filter designed like this. For the open loop characteristics of the control system constructed by this observer, the gain is raised at the low frequency range and the phase is raised at around the low frequency range, as shown by the bold lines in the frequency vs. gain characteristics in the top graph and the frequency vs. phase characteristics in the bottom graph in FIG. 12.

Therefore for the sensitivity function of the control system, the gain is suppressed at around the low frequency range, as shown by the bold line in the frequency vs. gain characteristics in FIG. 13. For the acceleration disturbance characteristics of the control system as well, the gain is suppressed in the low frequency range, as shown by the bold line in the frequency vs. gain characteristics in FIG. 14.

As this example shows, the disturbance suppression observer to suppress the high frequency range or to suppress the wide range at low frequency, which were difficult conventionally, can be easily implemented.

Second Embodiment of Observer

Figure 15:
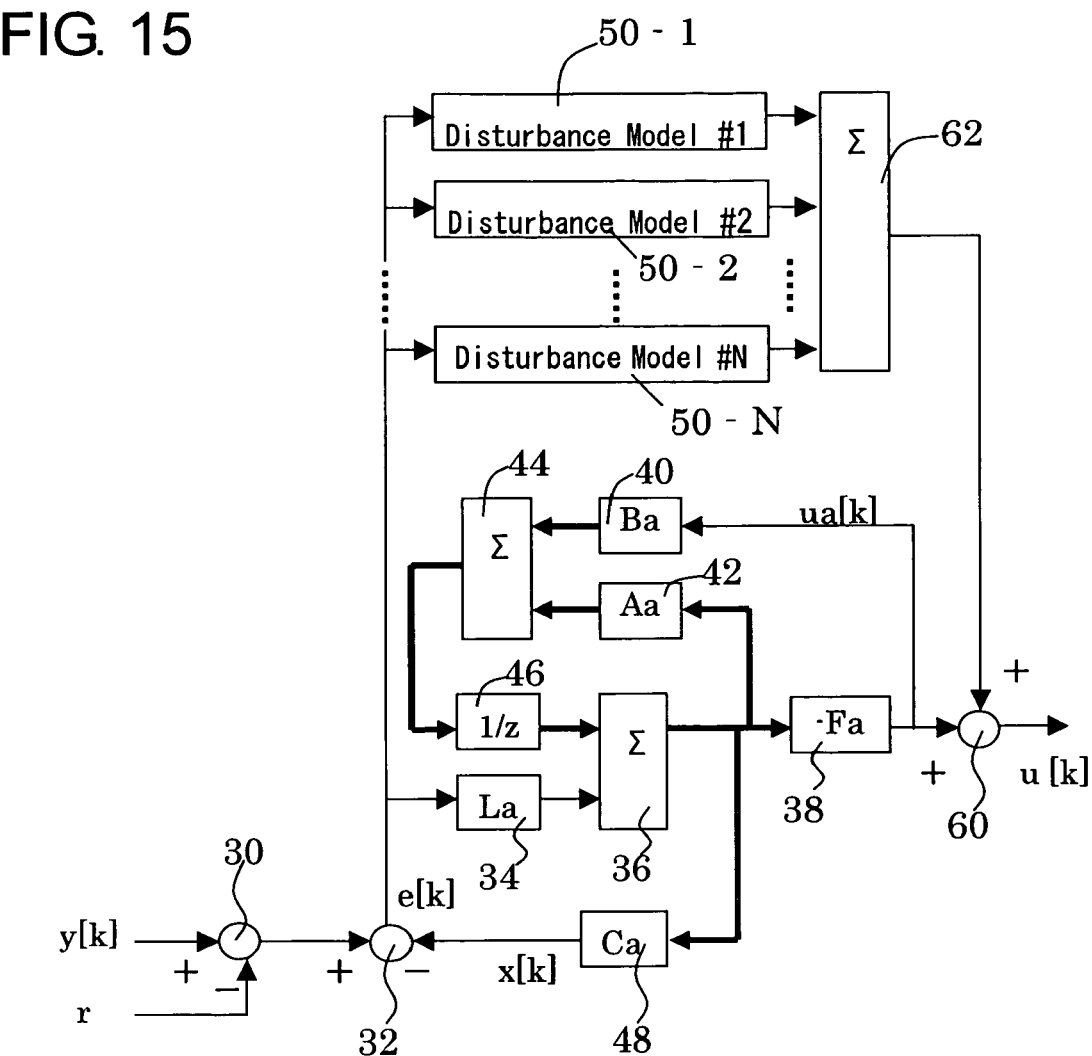
FIG. 15 is a block diagram depicting a disturbance observer control system of another embodiment of the present invention.

FIG. 15 is a block diagram depicting the second embodiment of the positioning control section for suppressing the disturbance which is executed by the MCU 14 in FIG. 1.

This positioning control system is an observer control system which detects the disturbance frequency and suppresses the disturbance by adaptive control, and is an adaptive control system where the disturbance models in FIG. 4 is separated, and a plurality of the disturbance models are provided.

In FIG. 15, composing elements the same as those in FIG. 4 are denoted with the same reference symbols, and each one of the disturbance models 50-1, . . . , 50-N is comprised of the blocks 51, 52, 54, 56 and 58 of the disturbance adaptive control model shown in FIG. 4.

Each disturbance model 50-1, . . . , 50-N is set for each disturbance frequency which requires follow up. The output of each disturbance model 50-1, . . . , 50-N is added in the addition block 62, and the result is output to the computing block 60. The operation of this model is the same as FIG. 4, so description thereof is omitted.

The observer when there are two disturbance models 50-1 and 50-2 is given by Expressions (19) to (23), which are Expressions (1) to (5) expanded for two models.

$$\begin{pmatrix} x(k) \\ v(k) \\ b(k) \\ z1(k) \\ z2(k) \\ z3(k) \\ z4(k) \end{pmatrix} = \begin{pmatrix} x(k) \\ v(k) \\ b(k) \\ z1(k) \\ z2(k) \\ z3(k) \\ z4(k) \end{pmatrix} + \begin{pmatrix} L1 \\ L2 \\ L3 \\ L4 \\ L5 \\ L6 \\ L7 \end{pmatrix} (y(k) - x(k)) \quad (19)$$

$$u(k) = -(F1 \ F2)\begin{pmatrix} x(k) \\ v(k) \end{pmatrix} \quad (20)$$

$$uout(k) = u(k) - (F3 \ F4 \ F5 \ F6 \ F7)\begin{pmatrix} b(k) \\ z1(k) \\ z2(k) \\ z3(k) \\ z4(k) \end{pmatrix} \quad (21)$$

$$\begin{pmatrix} x(k+1) \\ v(k+1) \end{pmatrix} = \begin{pmatrix} 1 & 1 \\ 0 & 1 \end{pmatrix}\begin{pmatrix} x(k) \\ v(k) \end{pmatrix} + \frac{Bl}{m}\frac{1}{Lp}T^2\begin{pmatrix} 1/2 \\ 1 \end{pmatrix}u(k) \quad (22)$$

$$\begin{pmatrix} z1(k+1) \\ z2(k+1) \end{pmatrix} = \begin{pmatrix} a11 & a12 \\ a21 & a22 \end{pmatrix}\begin{pmatrix} z1(k) \\ z2(k) \end{pmatrix} \quad (23)$$

$$\begin{pmatrix} z3(k+1) \\ z4(k+1) \end{pmatrix} = \begin{pmatrix} a11 & a12 \\ a21 & a22 \end{pmatrix}\begin{pmatrix} z3(k) \\ z4(k) \end{pmatrix}$$

In this case, the estimated quantity (variables) of position and velocity are z1 and z2, the estimated gains are L3, L4 and L5, and the output gains are F3, F4 and F5 in the disturbance model 50-1, and the estimated quantity (variables) of position and velocity are z3 and z4, the estimated gains are L6 and L7, and the output gains are F6 and F7 in the disturbance model 50-2.

In this example as well, as shown in FIG. 6, each disturbance model is designed by the shaping filter, and the expanded model is designed in the same way. With this configuration, a plurality of specific frequencies can be suppressed, as described in the following examples.

Examples of Second Embodiment

Figure 16:
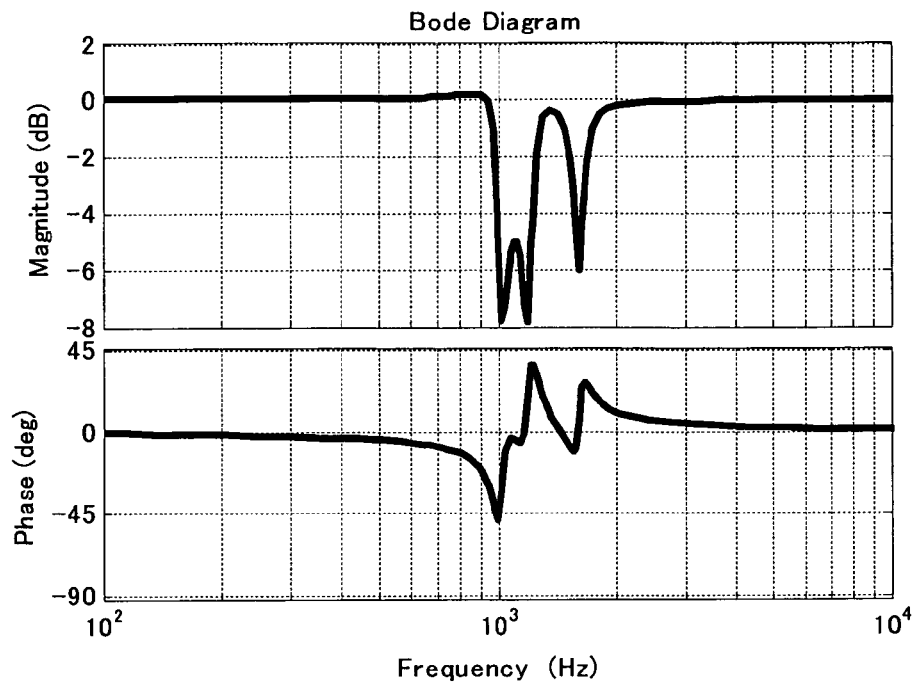
FIG. 16 is characteristic diagrams of the shaping filter of the first example of the embodiment in FIG. 15.
Figure 17:
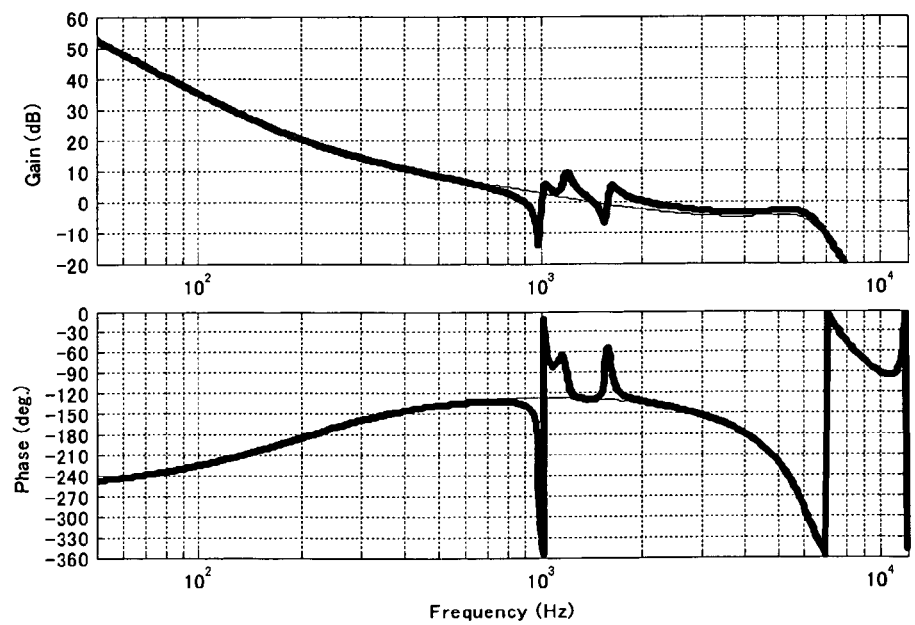
FIG. 17 is characteristic diagrams of the open loop of the first example of the embodiment in FIG. 15.
Figure 18:
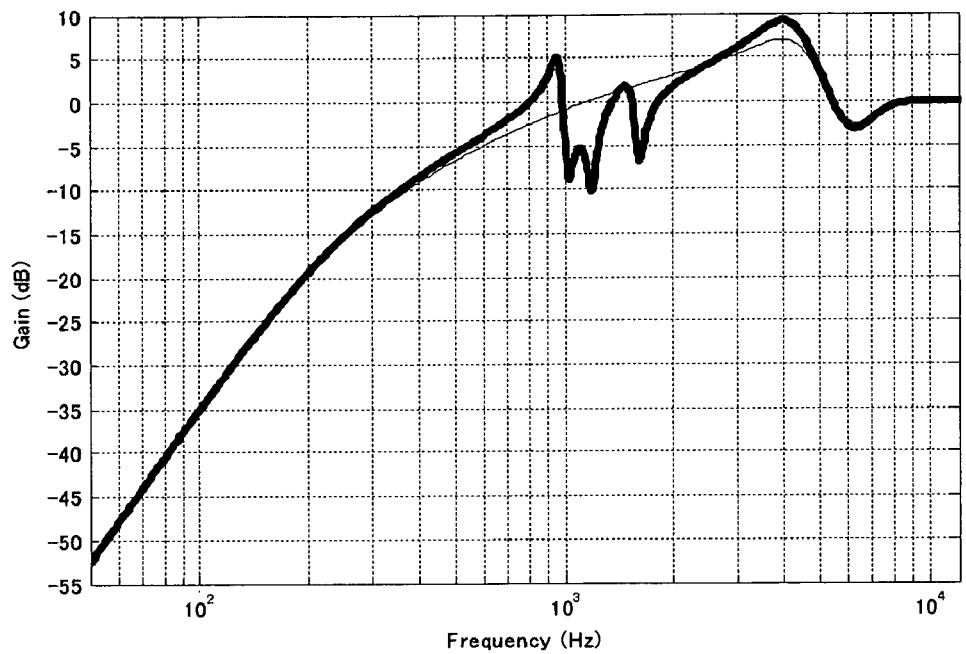
FIG. 18 is a characteristic diagram of the sensitivity function of the first example of the embodiment in FIG. 15.
Figure 19:
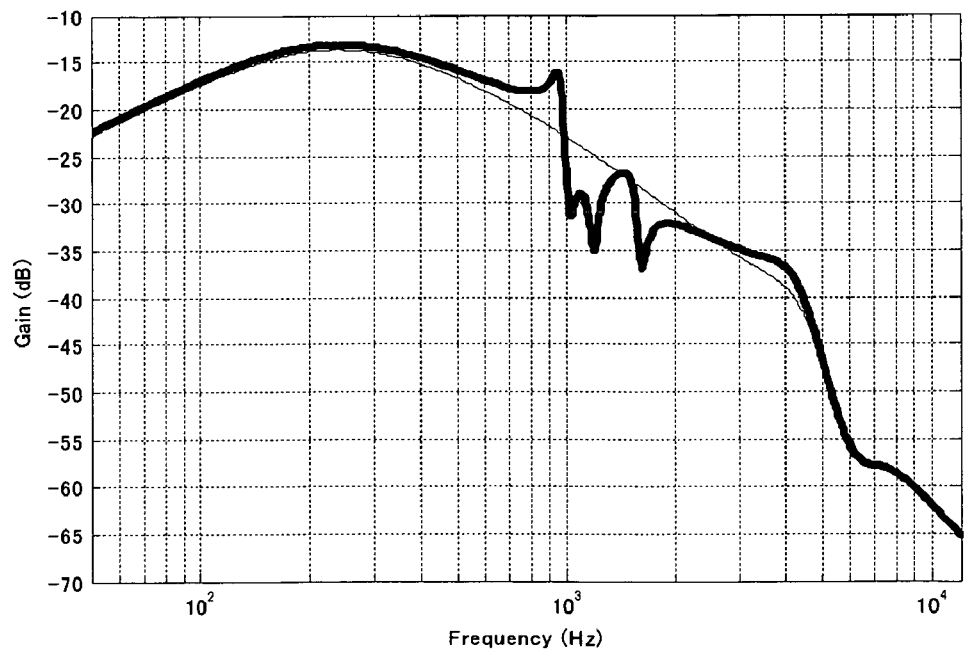
FIG. 19 is a characteristic diagram of the acceleration disturbance of the first example of the embodiment in FIG. 15.

FIG. 16 to FIG. 19 are diagrams depicting the first example of the second embodiment of the present invention, where FIG. 16 is characteristic diagrams of the shaping filter, FIG. 17 is open loop characteristic diagrams, FIG. 18 is a characteristic diagram of the sensitivity function, and FIG. 19 is a characteristic diagram of acceleration disturbance.

FIG. 16 to FIG. 19 are examples of an NRRO (Non-Repeatable Rotation) filter which suppresses three frequencies in notch form. Suppressing a plurality of frequencies is effective when the suppression width is increased to handle various disturbances.

To suppress a plurality of frequencies, the reverse characteristics of the notch filter must be inserted to the controller in multiple steps, and adjustment thereof is difficult.

In the present embodiment, a shaping filter for suppressing three specific frequencies (1000 Hz, 1100 Hz, 1600 Hz) is designed, as shown in FIG. 16. For this shaping filter, three quadratic filters, shown in Expression (10) are designed. In Expression (10), the first filter is $\omega 1=2\pi*1020$, $\omega 2=2\pi*1000$, $\zeta 1=0.025$ and $\zeta 2=0.05$. The second filter is $\omega 1=2\pi*1090$, $\omega 2=2\pi*1210$, $\zeta 1=0.025$ and $\zeta 2=0.05$, and the third filter is $\omega 1=2\pi*1600$, $\omega 2=2\pi*1600$, $\zeta 1=0.025$ and $\zeta 2=0.05$, which are connected in series. In other words, three disturbance models shown in FIG. 15 are designed.

For the frequency characteristics of this shaping filter, the gain is suppressed at three locations, around 1000 Hz, around 1100 Hz and around 1600 Hz, and the phase drops once at around 1000 Hz, then rises, and drops at around 1100 Hz, then rises at around 1600 Hz, and then drops, as shown in the frequency vs. gain characteristics in the top graph and the frequency vs. phase characteristics in the bottom graph in FIG. 16.

The above mentioned observer is constructed using the shaping filter designed like this. For the open loop characteristics of the control system constructed by this observer, the gain is dropped at 1000 Hz, 1100 Hz and 1600 Hz, and the phase is dropped at 1000 Hz, and is set to be peak at around 1100 Hz and 1600 Hz, as shown by the bold lines in the frequency vs. gain characteristics in the top graph and frequency vs. phase characteristics in the bottom graph in FIG. 17.

Therefore for the sensitivity function of the control system, the gain is suppressed at around 1000 Hz, 1100 Hz and 1600 Hz as shown by the bold line in the frequency vs. gain characteristics in FIG. 18. For the acceleration disturbance characteristics of the control system as well, the gain is suppressed at around 1000 Hz, 1100 Hz and 1600 Hz, as shown by the bold line in the frequency vs. gain characteristics in FIG. 19.

Figure 20:
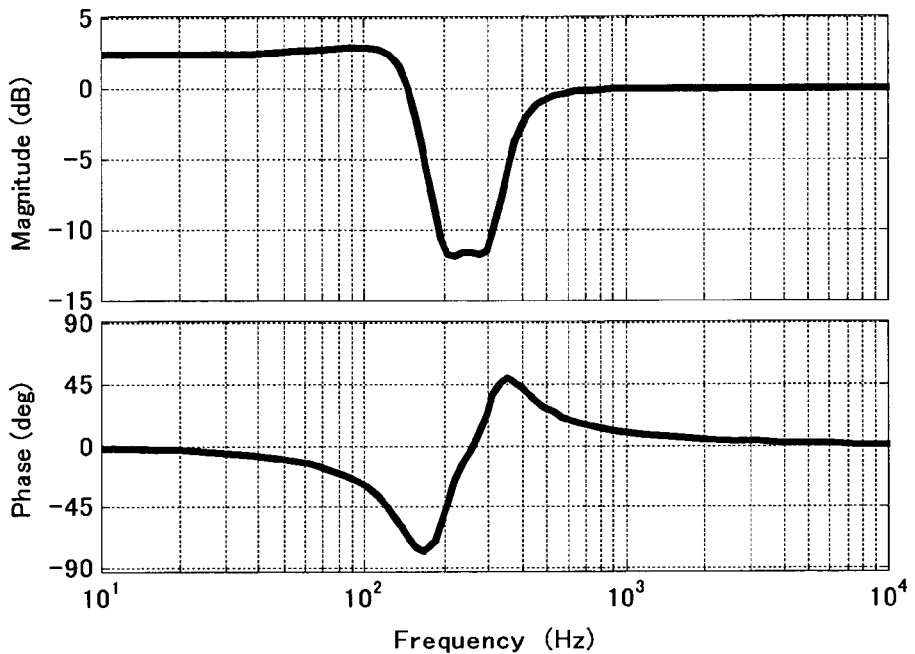
FIG. 20 is characteristic diagrams of the shaping filter of the second example of the embodiment in FIG. 15.
Figure 21:
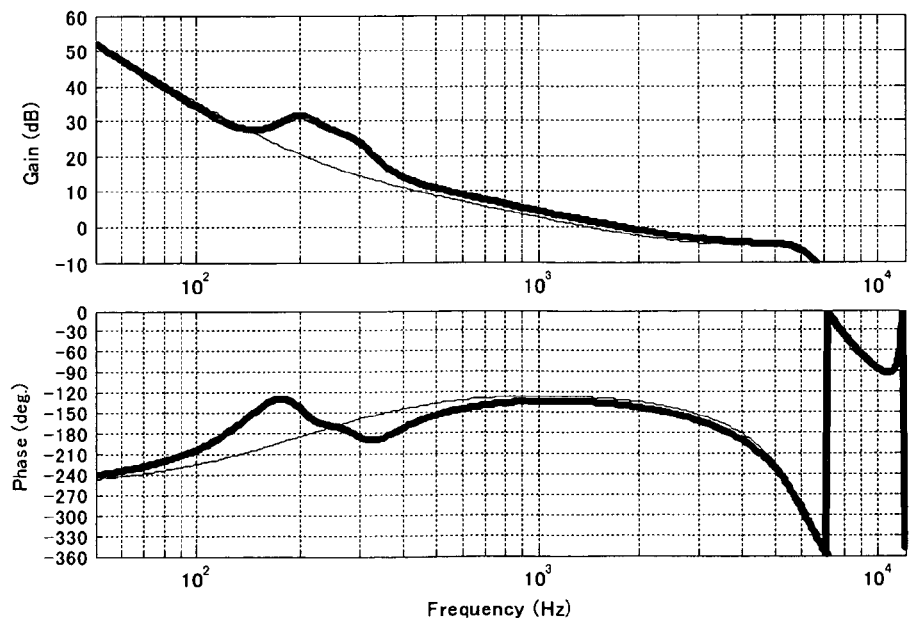
FIG. 21 is characteristic diagrams of the open loop of the second example of the embodiment in FIG. 15.
Figure 22:
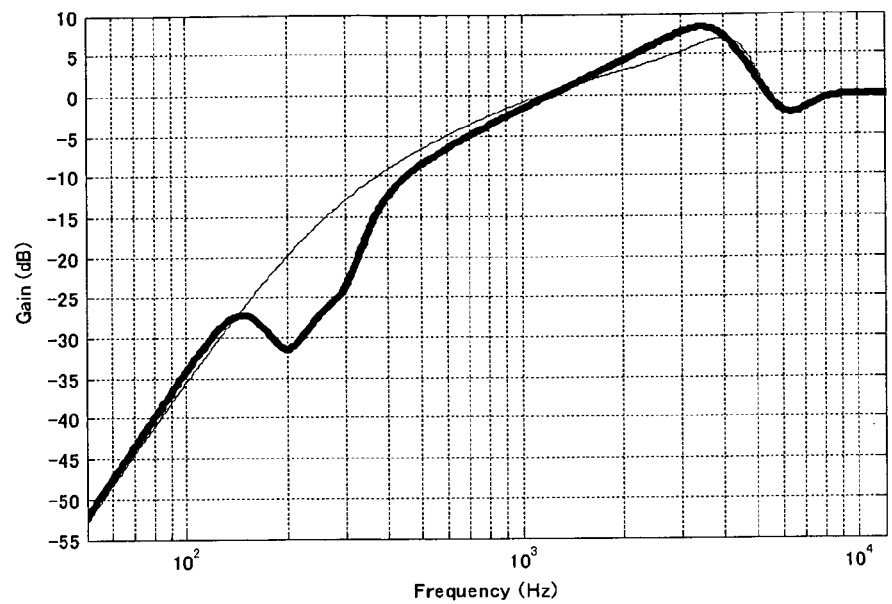
FIG. 22 is a characteristic diagram of the sensitivity function of the second example of the embodiment in FIG. 15.
Figure 23:
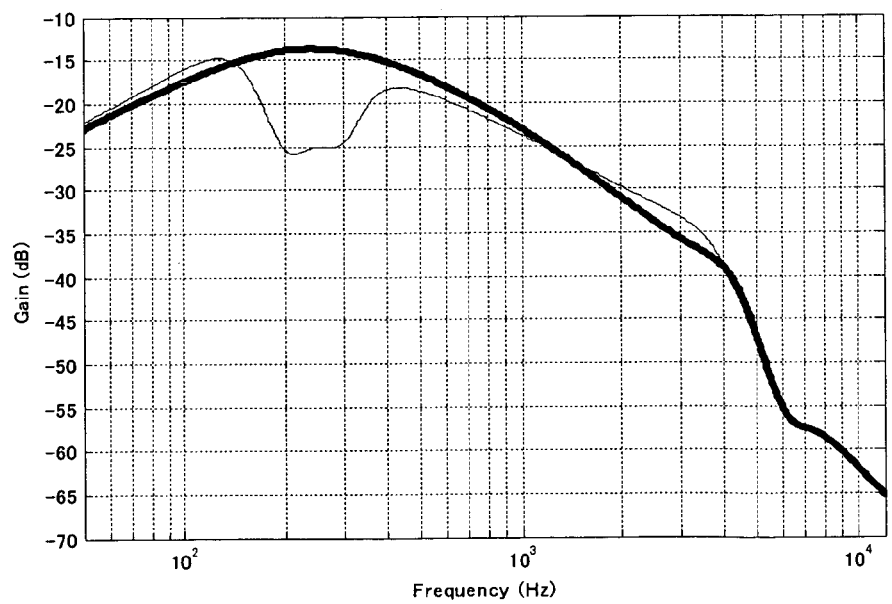
FIG. 23 is a characteristic diagram of the acceleration disturbance of the second example of the embodiment in FIG. 15.
Figure 24:
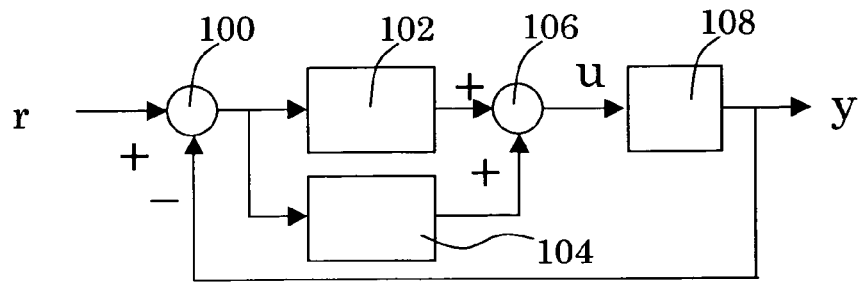
FIG. 24 is a diagram depicting a first prior art.
Figure 25:
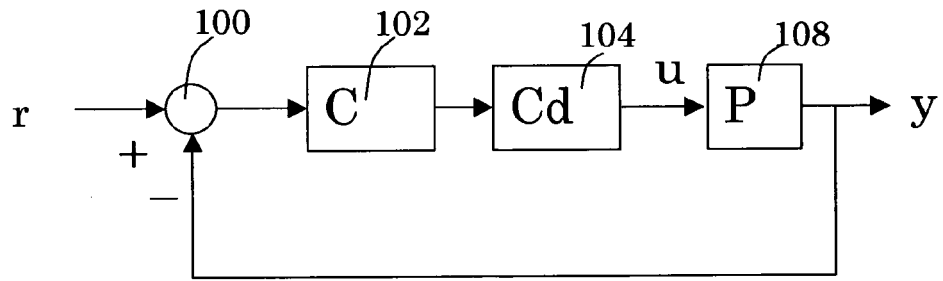
FIG. 25 is a diagram depicting a second prior art.
Figure 26:
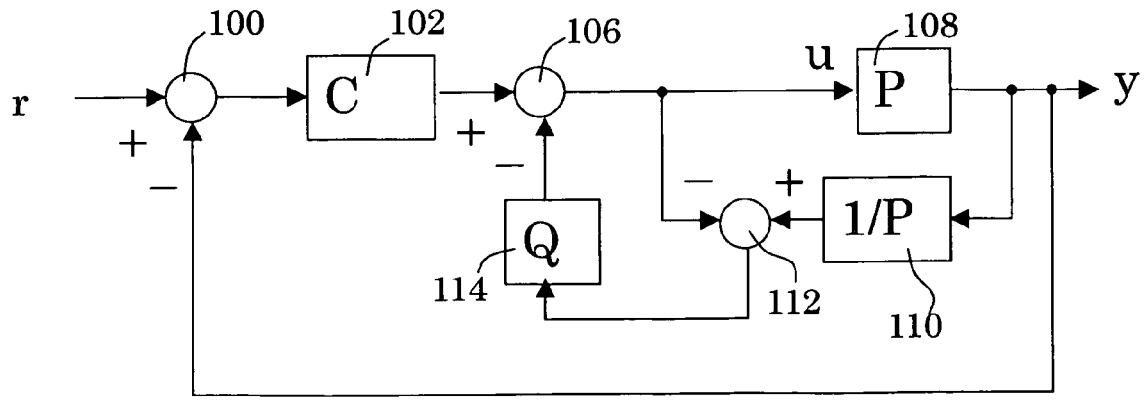
FIG. 26 is a diagram depicting a third prior art.

FIG. 20 to FIG. 23 are diagrams depicting the second example of the second embodiment of the present invention, where FIG. 20 is characteristic diagrams of the shaping filter, FIG. 21 is open loop characteristic diagrams, FIG. 22 is a characteristic diagram of the sensitivity function, and FIG. 23 is a characteristic diagram of acceleration disturbance.

FIG. 20 to FIG. 23 are examples of a band stop, which uniformly suppresses a specific band width in the low frequency range. The specific band width in the low frequency range must be uniformly suppressed in the case when the suppression width to external vibration is wide, and the follow up performance to acceleration disturbance is high. Many external vibration components in the low frequency range exist, and the influence thereof is conspicuous. It is difficult for a conventional observer to implement a wide suppression width in the low frequency range.

In the present embodiment, a shaping filter for suppressing a specific frequency band in low frequency in a wide range is shown in FIG. 20. In the case of this shaping filter, two quadratic filters shown in Expression (10) are designed. In Expression (10), the first filter is $\omega 1=2\pi*200$, $\omega 2=2\pi*150$, $\zeta 1=0.15$ and $\zeta 2=0.3$, and the second filter is $\omega 1=2\pi*300$, $\omega 2=2\pi*350$, $\zeta 1=0.15$ and $\zeta 2=0.3$, which are connected in series.

For the frequency characteristics of this shaping filter, the gain decreases when the frequency exceeds the lower limit (150 Hz) in the low frequency range, becomes constant at 200 to 300 Hz, then increases toward the upper limit (around 500 Hz in this case) in the low frequency range, and then becomes roughly constant, and the phase forms a lowest peak at the lower limit (150 Hz) in the low frequency range, and a highest peak at the upper limit (about 350 Hz in this case) in the low frequency range, as shown in the frequency vs. gain characteristics in the top graph and the frequency vs. phase characteristics in the bottom graph in FIG. 20.

The above mentioned observer, including the two disturbance models in FIG. 15, is constructed using the shaping filter designed like this. For the open loop characteristics of the control system constructed by this observer, the gain is raised at around 150 Hz to 500 Hz, and the phase is raised at around the lower limit (150 Hz) in the low frequency range, and dropped at the upper limit (around 350 Hz in this case) in the low frequency range, as shown by the bold line in the frequency vs. gain characteristics in the top graph and the frequency vs. phase characteristics in the bottom graph in FIG. 21.

Therefore for the sensitivity function of the control system, the gain is suppressed in a certain width in the low frequency range (150 Hz to 500 Hz), as shown by the bold line in the frequency vs. gain characteristics in FIG. 22. For the acceleration disturbance characteristics of the control system as well, the gain improves in a certain width in the low frequency range (150 Hz to 500 Hz) as shown by the bold line in the frequency vs. gain characteristics in FIG. 23. In other words, the gain of acceleration disturbance characteristics raises in a specific frequency with a width, and the peak of acceleration disturbance characteristics can be suppressed.

As this example shows, the disturbance suppression observer to suppress a plurality of different disturbance frequencies, or to suppress a wide width of a specific band in the low frequency range, which were difficult conventionally, can be easily implemented.

Other Embodiments

In the above embodiments, the disturbance observer control applied to the head positioning device of a magnetic disk device was described as an example, but the present invention can also be applied to other disk devices, such as an optical disk device. The number of the disturbance frequencies can be arbitrary according to necessity, and the number of disturbance models can be arbitrary accordingly. The examples were described using a quadratic filter, but a linear filter or a combination of a linear filter and a quadratic filter may be used according to the required suppressing frequencies.

The present invention was described using the embodiments, but the present invention can be modified in various ways within the scope of the essential character thereof, and these variant forms shall not be excluded from the scope of the present invention.

State information is generated using an estimated gain determined from a disturbance model defined by a transfer function of which denominator is a numerator of a filter in which degrees of denominator and nominator for shaping a sensitivity function are the same, and the disturbance suppression value of the actuator is computed from this state information, so the vibration of the head can be prevented adapting to a wide range of disturbance frequencies without affecting the control characteristics of the observer.

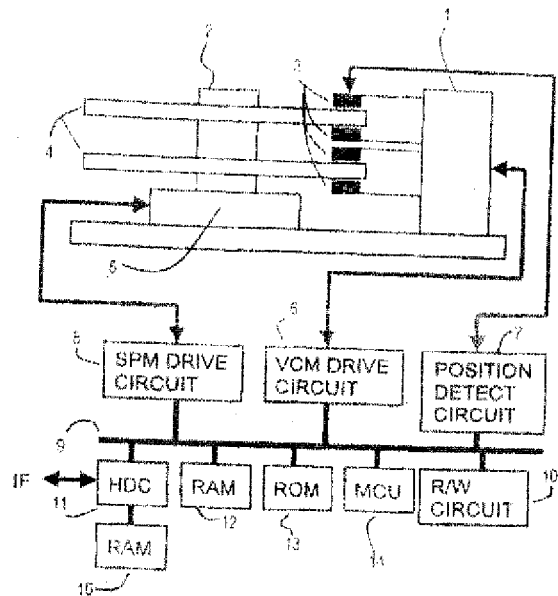

What is claimed is:

1. A head positioning control method for controlling positioning of a head to a predetermined position of a disk storage medium by an actuator, comprising the steps of:
computing a position error from a target position of said head and a current position acquired from said head;
generating state information using an estimated gain of said actuator according to an estimated position error between said position error and an estimated position of an observer, and computing a control value of said actuator from said state information;
computing a disturbance suppression value of said actuator from state information by generating the state information using an estimated gain determination from a disturbance model defined by a transfer function of which a denominator is a numerator of a filter in which degrees of denominator and numerator for shaping a sensitivity function are the same, according to said estimated position error; and
adding said control value and said disturbance suppression value, and driving said actuator,
wherein said disturbance suppression value computing step further comprises:
a step of generating state information using an estimated gain determined from a disturbance model of which pole is zero point of said numerator of the filter for shaping said sensitivity function according to a desired disturbance frequency.

2. A head positioning control method for controlling positioning of a head to a predetermined position of a disk storage medium by an actuator, comprising the steps of:
computing a position error from a target position of said head and a current position acquired from said head;
generating state information using an estimated gain of said actuator according to an estimated position error between said position error and an estimated position of an observer, and computing a control value of said actuator from said state information;
computing a disturbance suppression value of said actuator from state information by generating the state information using an estimated gain determination from a disturbance model defined by a transfer function of which a denominator is a numerator of a filter in which degrees of denominator and numerator for shaping a sensitivity function are the same, according to said estimated position error; and
adding said control value and said disturbance suppression value, and driving said actuator,
wherein said disturbance suppression value computing step further comprises:
a step of generating state information using an estimated gain determined from a disturbance model of which denominator is said numerator of a linear or a quadratic filter for shaping the sensitivity function according to a desired disturbance frequency.

3. A head positioning control method for controlling positioning of a head to a predetermined position of a disk storage medium by an actuator, comprising the steps of:
computing a position error from a target position of said head and a current position acquired from said head;
generating state information using an estimated gain of said actuator according to an estimated position error between said position error and an estimated position of an observer, and computing a control value of said actuator from said state information;
computing a disturbance suppression value of said actuator from state information by generating the state information using an estimated gain determination from a disturbance model defined by a transfer function of which a denominator is a numerator of a filter in which degrees of denominator and numerator for shaping a sensitivity function are the same, according to said estimated position error; and
adding said control value and said disturbance suppression value, and driving said actuator,
wherein said disturbance suppression value computing step further comprises the steps of:
generating state information using an estimated gain determined from a plurality of disturbance models defined by a transfer function of which denominator is said numerator of said plurality of filters according to a plurality of disturbance frequencies to be suppressed according to said estimated position error;
computing a plurality of disturbance suppression values of said actuator from said state information; and
adding said plurality of disturbance suppression values.

4. A disk device, comprising:
a head for at least reading data of a disk storage medium;

an actuator for positioning said head at a predetermined position of said disk storage medium; and a control unit for computing a position error from a target position of said head and a current position acquired from said head, generating state information using an estimated gain of said actuator according to an estimated position error between said position error and an estimated position of an observer, and computing a control value of said actuator from said state information, wherein said control unit generates state information using an estimated gain determined from a disturbance model defined by a transfer function of which a denominator is a numerator of a filter in which degrees of denominator and numerator for shaping a sensitivity function are the same, according to said estimated position error, computes a disturbance suppression value of said actuator from said state information, adds said control value and said disturbance suppression value, and drives said actuator.

5. The disk device according to claim 4, wherein said control unit generates state information using an estimated gain determined from a disturbance model of which pole is zero point of said numerator of the filter for shaping said sensitivity function according to a desired disturbance frequency, and computes a disturbance suppression value of said actuator from said state information.

6. The disk device according to claim 4, wherein said control unit generates state information using an estimated gain determined from a disturbance model of which denominator is said numerator of a linear or a quadratic filter for shaping the sensitivity function according to a desired disturbance frequency, and computes a disturbance suppression value of said actuator from said state information.

7. The disk device according to claim 4, wherein said control unit generates state information using an estimated gain determined from a plurality of disturbance models defined by a transfer function of which denominator is said numerator of said plurality of filters according to said plurality of disturbance frequencies to be suppressed according to said estimated position error, computes a plurality of disturbance suppression values of said actuator from said state information, and adds said plurality of disturbance suppression values.

8. The disk device according to claim 4, wherein said control unit generates state information using an estimated gain determined from a disturbance model defined by a transfer function of which denominator is said numerator of a linear filter for performing steady bias compensation and a quadratic filter for suppressing a range near a specific frequency to be a notch filter form, and computes a disturbance suppression value of said actuator from said state information.

9. The disk device according to claim 4, wherein said control unit generates state information using an estimated gain determined from a disturbance model defined by a transfer function of which denominator is said numerator of a linear filter for performing steady bias compensation and a quadratic filter for uniformly suppressing a specific frequency or less, and computes a disturbance suppression value of said actuator from said state information.

10. The disk device according to claim 8, wherein said control unit generates state information using an estimated gain determined from a disturbance model defined by a transfer function of which denominator is said numerator of a quadratic filter for suppressing around said specific frequency which is in a relatively high frequency range, to be a notch filter form, and computes a disturbance suppression value of said actuator from said state information.

11. The disk device according to claim 8, wherein said control unit generates state information using an estimated gain determined from a plurality of disturbance models defined by a transfer function of which denominator is said numerator of a plurality of quadratic filters for suppressing around said plurality of specific frequencies to be a notch filter form, and computes a disturbance suppression value of said actuator from said state information.

12. The disk device according to claim 9, wherein said control unit generates state information using an estimated gain determined from a disturbance model defined by a transfer function of which denominator is said numerator of a quadratic filter for uniformly suppressing said specific frequency or less, which is in a relatively low frequency range, and computes a disturbance suppression value of said actuator from said state information.

13. A head position control device for positioning a head for at least reading data of a disk storage medium to a predetermined position on said disk storage medium by controlling an actuator, comprising:

an observer for computing an estimated position error from a target position of said head and a current position acquired from said head, generating state information using an estimated gain of said actuator according to an estimated position error between said position error and an estimated position of said observer, and computing a control value of said actuator from said state information;

a disturbance observer for generating state information using an estimated gain determined from a disturbance model defined by a transfer function of which denominator is a numerator of a filter in which degrees of denominator and numerator for shaping a sensitivity function are the same, according to said estimated position error, and computing a disturbance suppression value of said actuator from said state information; and an addition block for adding said control value and said disturbance suppression value, and driving said actuator.

14. The head position control device according to claim 13, wherein said disturbance observer generates state information using an estimated gain determined from a disturbance model of which pole is zero point of said numerator of the filter for shaping said sensitivity function according to a desired disturbance frequency, and computes a disturbance suppression value of said actuator from said state information.

15. The head position control device according to claim 13, wherein said disturbance observer generates state information using an estimated gain determined from a disturbance model of which denominator is said numerator of a linear or a quadratic filter for shaping the sensitivity function according to a desired disturbance frequency, and computes a disturbance suppression value of said actuator from said state information.

16. The head position control device according to claim 13, wherein said disturbance observer generates state information using an estimated gain determined from a plurality of disturbance models defined by a transfer function of which denominator is said numerator of said plurality of filters according to said plurality of disturbance frequencies to be suppressed according to said estimated position error, computes a plurality of disturbance suppression values of said actuator from said state information, and adds said plurality of disturbance suppression values.

17. The head position control device according to claim 13, wherein said disturbance observer generates state information using an estimated gain determined from a disturbance model defined by a transfer function of which denominator is said numerator of a linear filter for performing steady bias compensation and a quadratic filter for suppressing around a specific frequency to be a notch filter form, and computes a disturbance suppression value of said actuator from said state information.

18. The head position control device according to claim 13, wherein said disturbance observer generates state information using an estimated gain determined from a disturbance model defined by a transfer function of which denominator is said numerator of a linear filter for performing steady bias compensation and a quadratic filter for uniformly suppressing a specific frequency or less, and computes a disturbance suppression value of said actuator from said state information.

19. The head position control device according to claim 17, wherein said disturbance observer generates state information using an estimated gain determined from a disturbance model defined by a transfer function of which denominator is said numerator of a quadratic filter for suppressing around said specific frequency, which is in a relatively high frequency range, to be a notch filter form, and computes a disturbance suppression value of said actuator from said state information.

* * * * *

UNITED STATES PATENT AND TRADEMARK OFFICE
CERTIFICATE OF CORRECTION

| | | |
|---|---|---|
| PATENT NO. | : 7,466,101 B2 | |
| APPLICATION NO. | : 11/513989 | |
| DATED | : December 16, 2008 | |
| INVENTOR(S) | : Takaishi | |

It is certified that error appears in the above-identified patent and that said Letters Patent is hereby corrected as shown below:

The Title Page, showing an illustrative figure, should be deleted and substitute therefore the attached title page.

On the Title Page:

Under Item "(56) References Cited - Foreign Patent Documents" insert the following: --KR 2006-0089837 Aug. 2006--.

UNITED STATES PATENT AND TRADEMARK OFFICE
CERTIFICATE OF CORRECTION

PATENT NO.       : 7,466,101 B2                                          Page 2 of 3
APPLICATION NO.  : 11/513989
DATED            : December 16, 2008
INVENTOR(S)      : Takaishi It is certified that error appears in the above-identified patent and that said Letters Patent is hereby corrected as shown below:

In the Drawings:

Please insert Fig. 1.

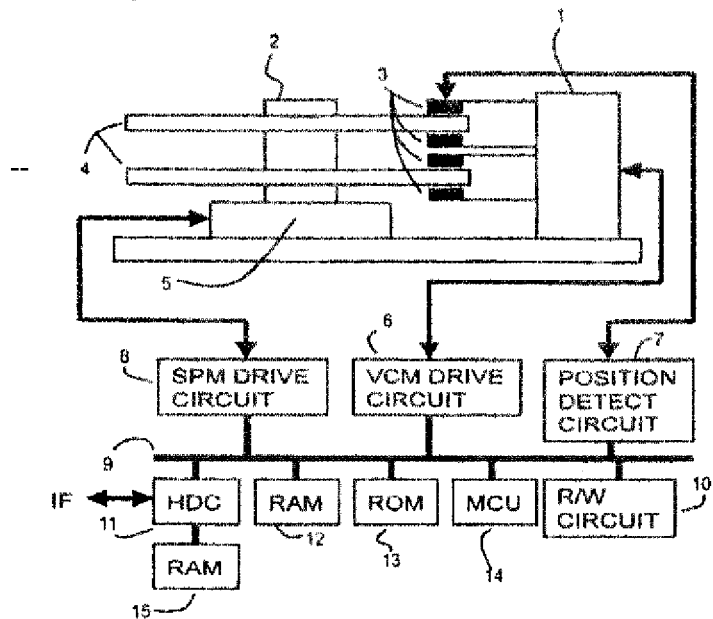

Signed and Sealed this

Twenty-ninth Day of December, 2009

David J. Kappos
*Director of the United States Patent and Trademark Office*

United States Patent
Takaishi

(10) Patent No.: US 7,466,101 B2
(45) Date of Patent: Dec. 16, 2008

(54) HEAD POSITION CONTROL METHOD, HEAD POSITION CONTROL DEVICE, AND DISK DEVICE

(75) Inventor: Kazuhiko Takaishi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 103 days.

(21) Appl. No.: 11/513,989

(22) Filed: Aug. 31, 2006

(65) Prior Publication Data
US 2007/0252550 A1 Nov. 1, 2007

(30) Foreign Application Priority Data
Apr. 28, 2006 (JP) .................. 2006-125113

(51) Int. Cl.
*G05B 1/00* (2006.01)
(52) U.S. Cl. .................. 318/638; 318/560; 360/77.02; 360/77.07; 700/11; 700/12; 700/13
(58) Field of Classification Search .............. 318/638, 318/560; 360/77.02, 77.07; 700/11, 12, 700/13
See application file for complete search history.

(56) References Cited

U.S. PATENT DOCUMENTS

| | | | | |
|---|---|---|---|---|
| 5,155,422 A | * | 10/1992 | Sidman et al. | 318/560 |
| 5,296,790 A | * | 3/1994 | Fincher | 318/560 |
| 5,404,253 A | | 4/1995 | Painter | |
| 5,459,381 A | * | 10/1995 | Itoh | 318/560 |
| 5,952,804 A | * | 9/1999 | Hamamura et al. | 318/560 |
| 6,314,473 B1 | * | 11/2001 | Singer et al. | 710/5 |
| 6,339,512 B1 | | 1/2002 | Sri-Jayantha et al. | |
| 6,487,028 B1 | | 11/2002 | Sri-Jayantha et al. | |
| 6,560,658 B2 | * | 5/2003 | Singer et al. | 710/5 |
| 6,876,168 B1 | * | 4/2005 | Luo et al. | 318/560 |
| 6,936,990 B2 | * | 8/2005 | Oyama et al. | 318/632 |
| 6,940,685 B2 | * | 9/2005 | Chrappan Soldavini et al. | 360/78.06 |

(Continued)

FOREIGN PATENT DOCUMENTS

EP 1 643 491 A1 4/2006

(Continued)

OTHER PUBLICATIONS

Bickel et al.; "Disturbance Observer Based Hybrid Impedance Control", Proceedings of the American Control Conference; 1994; pp. 729-733.

(Continued)

*Primary Examiner* — Rita Leykin
(74) *Attorney, Agent, or Firm* — Greer, Burns & Crain, Ltd.

(57) ABSTRACT

A positioning control device based on an observer control has a disturbance suppression function to which a disturbance suppression function is added without affecting the control characteristics of the observer. Models of an actuator and a disturbance model are separated, and for the disturbance model, state information is generated using an estimated gain determined from a disturbance model defined by a transfer function of which denominator is a numerator of a filter in which degrees of denominator and numerator for shaping a sensitivity function are the same, and the disturbance suppression value of the actuator is computed from the state information. The vibration of the head can be prevented adapting to a wide range of disturbance frequencies without affecting the control characteristics of the observer.

19 Claims, 16 Drawing Sheets